United States Patent
Nagae et al.

(10) Patent No.: US 10,078,558 B2
(45) Date of Patent: Sep. 18, 2018

(54) DATABASE SYSTEM CONTROL METHOD AND DATABASE SYSTEM

(71) Applicant: HITACHI, LTD., Tokyo (JP)

(72) Inventors: Noriko Nagae, Tokyo (JP); Norihiro Hara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 291 days.

(21) Appl. No.: 14/907,653

(22) PCT Filed: Jan. 10, 2014

(86) PCT No.: PCT/JP2014/050322
§ 371 (c)(1),
(2) Date: Jan. 26, 2016

(87) PCT Pub. No.: WO2015/104835
PCT Pub. Date: Jul. 16, 2015

(65) Prior Publication Data
US 2016/0170845 A1  Jun. 16, 2016

(51) Int. Cl.
*G06F 17/00* (2006.01)
*G06F 11/14* (2006.01)
*G06F 17/30* (2006.01)
*G06F 11/20* (2006.01)

(52) U.S. Cl.
CPC ...... *G06F 11/1471* (2013.01); *G06F 11/2023* (2013.01); *G06F 11/2064* (2013.01); *G06F 11/2097* (2013.01); *G06F 17/30368* (2013.01); *G06F 17/30575* (2013.01); *G06F 17/30578* (2013.01); *G06F 2201/80* (2013.01); *G06F 2201/84* (2013.01)

(58) Field of Classification Search
CPC ......... G06F 17/30368; G06F 17/30575; G06F 17/30; G06F 11/1451
USPC .................................................. 707/600–899
See application file for complete search history.

(56) References Cited

U.S. PATENT DOCUMENTS

| | | | |
|---|---|---|---|
| 5,640,561 A | 6/1997 | Satoh et al. | |
| 6,438,563 B1 * | 8/2002 | Kawagoe | G06F 11/1658 |
| 2004/0193625 A1 | 9/2004 | Sutoh et al. | |

(Continued)

FOREIGN PATENT DOCUMENTS

| | | |
|---|---|---|
| JP | 2003-099306 A | 4/2003 |
| JP | 2004-348701 A | 12/2004 |

(Continued)

*Primary Examiner* — Isaac M Woo
(74) *Attorney, Agent, or Firm* — Volpe and Koenig, P.C.

(57) ABSTRACT

This database system includes a first site that provides a database and a second site that stores a copy of said database. A first computer for the first site performs database processing and updates the data in the database. A first original storage for the first site transmits data to a second original storage for the second site asynchronously with respect to a database management unit, and a first duplicate storage for the first site transmits data to a second duplicate storage for the second site asynchronously with respect to the database management unit. A second computer for the second site compares the data in the second original storage with the data in the second duplicate with prescribed timing and restores the database if the data in the second original storage and the data in the second duplicate storage do not match.

13 Claims, 31 Drawing Sheets

(56) References Cited

U.S. PATENT DOCUMENTS

2004/0193658 A1   9/2004  Kawamura et al.
2005/0210073 A1   9/2005  Deda et al.
2006/0010180 A1   1/2006  Kawamura et al.
2010/0121824 A1   5/2010  Kawamura et al.

FOREIGN PATENT DOCUMENTS

JP     2005-267301 A   9/2005
JP     4301849 B2   7/2009

* cited by examiner

320 ORIGINAL CHECKPOINT INFORMATION 321

| LSN |
|---|
| DBSTART |
| 50 |
| 100 |
| DBEND |

330 ORIGINAL LOG

| LSN 331 | TRANSACTION IDENTIFIER 332 | LOG TYPE 333 | DATA IDENTIFIER 334 | PRE-UPDATE DATA 335 | POST-UPDATE DATA 336 |
|---|---|---|---|---|---|
| 1 | T1 | START | — | — | — |
| 2 | T1 | UPDATE | A | 1000 | 950 |
| 3 | T1 | UPDATE | B | 2000 | 2050 |
| 4 | T1 | COMMIT | — | — | — |
| .. | .. | .. | .. | .. | .. |
| 49 | — | CP START | — | — | — |
| 50 | — | CP END | — | — | — |
| .. | .. | .. | .. | .. | .. |
| 100 | — | CP END | — | — | — |
| .. | .. | .. | .. | .. | .. |
| 120 | Tn | — | D | 500 | 0 |

Fig. 4

270 DB-VOLUME MAPPING TABLE

| 271 DB DOMAIN ID | 272 SYSTEM | 273 TYPE | 274 MAIN SYSTEM STORAGE SYSTEM ID | 275 MAIN SYSTEM LOGICAL VOLUME ID | 276 REMOTE SYSTEM STORAGE SYSTEM ID | 277 REMOTE SYSTEM LOGICAL VOLUME ID |
|---|---|---|---|---|---|---|
| DBAREA | ORIGINAL | DB DATA | CTL#A1 | VOL1-A1 | CTL#B1 | VOL1-B1 |
| DBAREA | DUPLICATE | DB DATA | CTL#A2 | VOL1-A2 | CTL#B2 | VOL1-B2 |
| LOG1 | ORIGINAL | LOG | CTL#A1 | VOL2-A1 | CTL#B1 | VOL2-B1 |
| LOG2 | DUPLICATE | LOG | CTL#A2 | VOL2-A2 | CTL#B2 | VOL2-B2 |
| CHKPNT1 | ORIGINAL | CHECKPOINT | CTL#A1 | VOL3-A1 | CTL#B1 | VOL3-B1 |
| CHKPNT2 | DUPLICATE | CHECKPOINT | CTL#A2 | VOL3-A2 | CTL#B2 | VOL3-B2 |

Fig. 5

280   DB DEFINITION INFORMATION TABLE

| /281 PARAMETER | /282 VALUE |
|---|---|
| WRITE TIME OBTAINING MODE (WHETHER REMOTE SYSTEM CAN OBTAIN THE MAIN SYSTEM VOLUME WRITE TIME INFORMATION OR NOT) | N |
| MIRRORED VOLUME SYNCHRONIZATION FUNCTION UTILIZATION MODE | N |

Fig. 6

290-1  CHECKPOINT INFORMATION MANAGEMENT TABLE #1

| /291 CHECKPOINT INFORMATION ID (DATABASE INFORMATION ID) | /292 SYSTEM | /293 TYPE | /294 LSN | /295 CHECKPOINT INFORMATION SELECTING FLAG |
|---|---|---|---|---|
| CHKPNT1 | ORIGINAL | CHECKPOINT | 90 | OFF |
| CHKPNT2 | DUPLICATE | CHECKPOINT | 85 | ON |

Fig. 7

290-2 CHECKPOINT INFORMATION MANAGEMENT TABLE #2

| CHECKPOINT INFORMATION ID (DATABASE INFORMATION ID) 291 | SYSTEM 292 | TYPE 293 | STORAGE SYSTEM ID 296 | LOGICAL VOLUME ID 297 | MAIN SYSTEM WRITE TIME 298 | CHECKPOINT INFORMATION SELECTING FLAG 295 |
|---|---|---|---|---|---|---|
| CHKPNT1 | ORIGINAL | CHECKPOINT | CTL#B1 | VOL3-B1 | 14:50 | OFF |
| CHKPNT2 | DUPLICATE | CHECKPOINT | CTL#B2 | VOL3-B2 | 14:40 | ON |

Fig. 8

340-1 WRITE TIME MANAGEMENT TABLE (ORIGINAL STORAGE SYSTEM OF MAIN SYSTEM)

| 341 LOGICAL VOLUME ID | 342 WRITE TIME |
|---|---|
| VOL1-A1 | 2013/11/12 15:05:00 |
| VOL2-A1 | 2013/11/12 15:07:25 |
| VOL3-A1 | 2013/11/12 15:05:00 |

Fig. 9A 340-2 WRITE TIME MANAGEMENT TABLE (DUPLICATE STORAGE SYSTEM OF MAIN SYSTEM)

| 341 LOGICAL VOLUME ID | 342 WRITE TIME |
|---|---|
| VOL1-A2 | 2013/11/12 15:05:00 |
| VOL2-A2 | 2013/11/12 15:07:25 |
| VOL3-A2 | 2013/11/12 15:05:00 |

Fig. 9B 340-3 WRITE TIME MANAGEMENT TABLE (ORIGINAL STORAGE SYSTEM OF REMOTE SYSTEM)

| LOGICAL VOLUME ID (341) | WRITE TIME (342) |
|---|---|
| VOL1-B1 | 2013/11/12 15:02:00 |
| VOL2-B1 | 2013/11/12 15:03:25 |
| VOL3-B1 | 2013/11/12 15:02:00 |

Fig. 9C 340-4 WRITE TIME MANAGEMENT TABLE (DUPLICATE STORAGE SYSTEM OF REMOTE SYSTEM)

| LOGICAL VOLUME ID (341) | WRITE TIME (342) |
|---|---|
| VOL1-B2 | 2013/11/12 14:59:00 |
| VOL2-B2 | 2013/11/12 15:00:30 |
| VOL3-B2 | 2013/11/12 14:59:00 |

Fig. 9D

510 SYSTEM DETERMINATION RESULT MANAGEMENT TABLE

| STORAGE SYSTEM ID OF SYNCHRONIZATION SOURCE (511) | STORAGE SYSTEM ID OF SYNCHRONIZATION TARGET (512) |
|---|---|
| CTL#B2 | CTL#B1 |

Fig. 29

520 VOLUME SYNCHRONIZATION INFORMATION TABLE

| TYPE (521) | STORAGE SYSTEM ID OF SYNCHRONIZATION SOURCE (522) | LOGICAL VOLUME ID OF SYNCHRONIZATION SOURCE (523) | STORAGE SYSTEM ID OF SYNCHRONIZATION TARGET (524) | LOGICAL VOLUME ID OF SYNCHRONIZATION TARGET (525) |
|---|---|---|---|---|
| DBAREA | CTL#B2 | VOL1-B2 | CTL#B1 | VOL1-B1 |
| LOG | CTL#B2 | VOL2-B2 | CTL#B1 | VOL2-B1 |
| CHKPNT | CTL#B2 | VOL3-B2 | CTL#B1 | VOL3-B1 |

Fig. 30

DATABASE SYSTEM CONTROL METHOD AND DATABASE SYSTEM

BACKGROUND

The present invention relates to a database system that employs disaster recovery.

In the database management system (will be referred to as DBMS below) that employs disaster recovery, a method is known in which logs in the database are transferred from the main system and written into a remote system for synchronization, using the remote copy feature of the storage apparatus, and database data (DB data) and checkpoint information are transferred and written into the remote site in an asynchronous manner (Patent Documents 1 and 2, for example).

The technology using logs is known for a recovery method from a failure of the database system (Patent Document 3, for example).

[Patent Document 1] Japanese Patent No. 4301849
[Patent Document 2] Japanese Patent Application Laid-open Publication No. 2005-267301
[Patent Document 3] U.S. Pat. No. 5,640,561

SUMMARY

However, in the conventional examples described above, database logs are synchronized with the remote system, and therefore, processes to generate, store, and transfer the logs are necessary. The synchronization process of the logs requires computer resources, which lowers the processing capacity such as on-line performance of the DBMS of the main system in some cases. In particular, when a large amount of data such as big data is to be processed, the processing capacity of the DBMS of the main system lowers due to the log processing.

In the conventional examples described above, when the main system fails, the database can be recovered in the remote system. However, this technology had a problem of not being able to recover the database with ease if the remote system fails after the main system failed.

The present invention is aiming at quickly recovering the database in the remote system when the main system failed without adversely affecting the processing capacity of the main system, and thereby ensuring the reliability with the remote system alone.

A representative aspect of this invention is as follows. A database system control method including a first site configured to provide database and a second site configured to store a copy of the database, the database system being configured to recover the database by a control computer of the second site, the first site comprising: a first computer that includes a processor and a memory and that operates a database management unit configured to control the database; a first original storage apparatus for storing data related to the database; and a first duplicate storage apparatus for storing a copy of the data stored in the first original storage apparatus, the second site comprising: a second computer that includes a processor and a memory and that operates a restart processing unit configured to recover the database; a second original storage apparatus for storing the data received from the first original storage apparatus; and a second duplicate storage apparatus for storing the data received from the first duplicate storage apparatus, the control method comprising: a first step in which the first computer processes the database and updates the data in the database; a second step in which the first original storage apparatus sends the data to the second original storage apparatus asynchronously with the database management unit; a third step in which the first duplicate storage apparatus sends the data to the second duplicate storage apparatus asynchronously with the database management unit; a fourth step in which the second computer compares the data of the second original storage apparatus and the data of the second duplicate storage apparatus at a prescribed timing; and a fifth step in which, if the data of the second original storage apparatus and the data of the second duplicate storage apparatus have discrepancy as a result of the comparison, the second computer recovers the database.

According to the present invention, when the first site (main system) fails, the database can be reliably recovered in the second site (remote system) without adversely affecting the processing capacity of the first site by the asynchronous backup with the database management unit, which makes it possible to ensure the reliability of the remote site.

BRIEF DESCRIPTION OF THE DRAWINGS

FIG. 4 is a diagram showing a relationship between the original log and the original checkpoint information according to the first embodiment of this invention.

FIG. 5 is a diagram showing an example of the DR-volume mapping table according to the first embodiment of this invention.

FIG. 6 is a diagram showing an example of a DB definition information table according to the first embodiment of this invention.

FIG. 7 is a diagram showing an example of a checkpoint information management table #1 according to the first embodiment of this invention.

FIG. 8 is a diagram showing an example of a checkpoint information management table #2 according to the first embodiment of this invention.

FIG. 9A is a WRITE time management table of the original storage system of the main system according to the first embodiment of this invention.

FIG. 9B is a WRITE time management table of the duplicate storage system of the main system according to the first embodiment of this invention.

FIG. 9C is a WRITE time management table of the original storage system of the remote system according to the first embodiment of this invention.

FIG. 9D is a WRITE time management table of the duplicate storage system of the remote system according to the first embodiment of this invention.

FIG. 29 is a diagram showing an example of a system determination result management table according to the third embodiment of this invention.

FIG. 30 is a diagram showing an example of the volume synchronization information table according to the third embodiment of this invention.

DETAILED DESCRIPTION OF THE PREFERRED EMBODIMENTS

Figure 1:
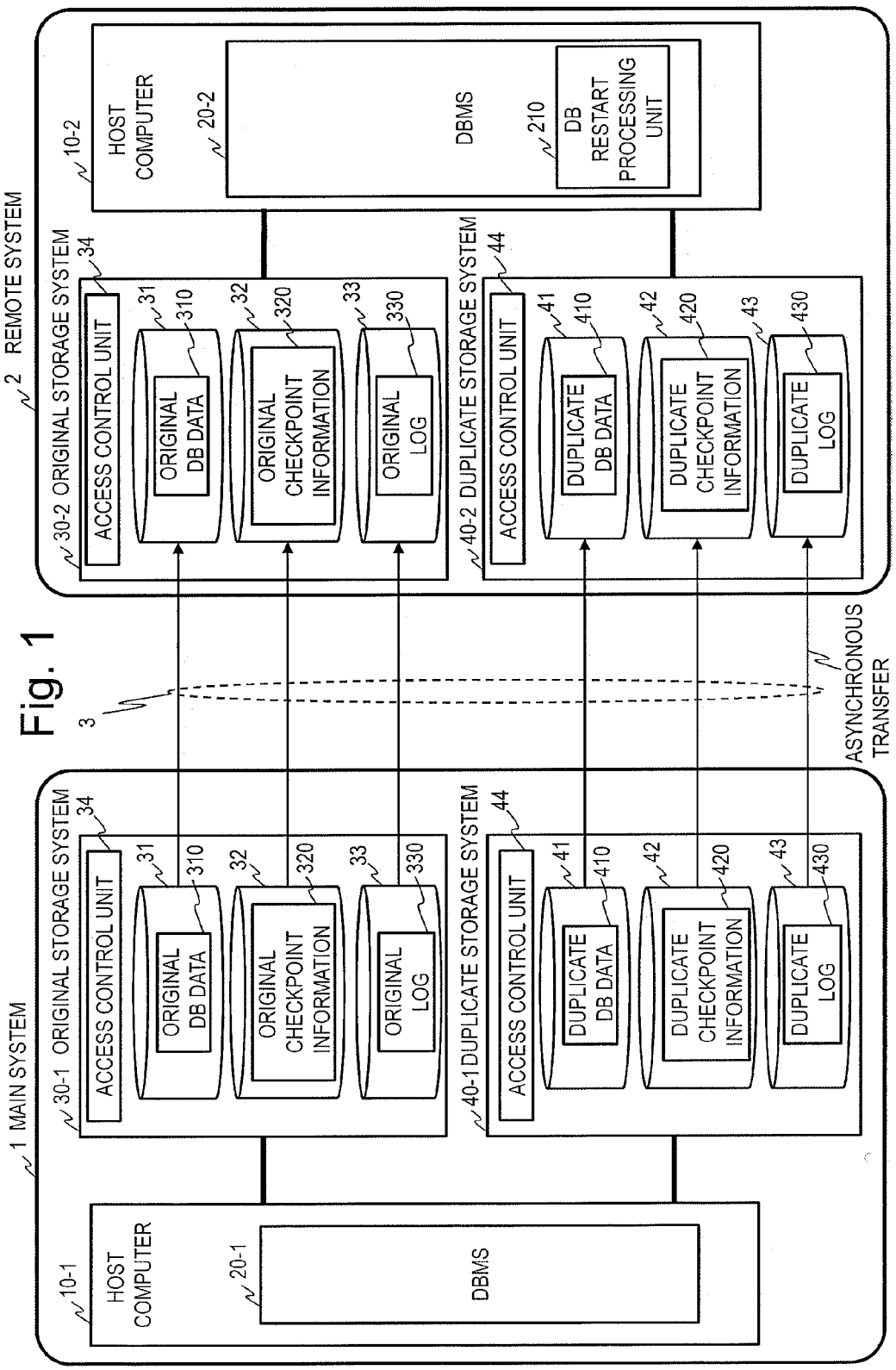
FIG. 1 is a block diagram showing an example of a database system according to a first embodiment of this invention.

FIG. 1 is a block diagram showing an example of a database system of Embodiment 1 of the present invention. The database system is a computer system in which the database of a main system 1 is backed up in a remote system using disaster recovery, and when the main system fails, the database is provided by the remote system 2.

<System Configuration>

The main system 1 and the remote system 2 are coupled to each other via a network 3. The main system 1 and the remote system 2 may have the same configuration. In the main system 1, a host computer 10-1 that operates a database management system (database management unit) 20-1 to provide the database, an original storage system 30-1 that stores therein original data of the database to be provided (original DB data 310, original log 330, and original checkpoint information 320), and a duplicate storage system 40-1 that stores therein the copy of the original data (duplicate data) are coupled to each other via a network or a host computer 10.

In the remote system 2, a host computer 10-2 that operates a database management system 20-2, an original storage system 30-2 that stores therein the copy of the original data stored in the original storage system 30-1 in an asynchronous manner, and a duplicate storage system 40-2 that stores therein the copy of the duplicate data stored in the duplicate storage system 40-1 in an asynchronous manner are coupled to each other via a network.

The main system 1 and the remote system 2 may have the same configuration. The host computers 10-1 and 10-2 have the same configuration, and the original storage systems 30-1 and 30-2 as well as the duplicate storage systems 40-1 and 40-2 also have the same configurations, respectively.

In the explanation below, the reference character 10 denotes all of the host computers collectively. Similarly, for other components, the reference characters without suffix are used to collectively refer to respective components, and when it is necessary to differentiate the main system 1 from the remote system 2, a suffix is given.

The original storage system 30-1 includes an original DB data volume 31 for storing the original DB data 310, an original checkpoint information volume 32 for storing the original checkpoint information 320, an original log volume 33 for storing the original log 330, and an access control unit 34 that controls these volumes 31 to 33.

The access control unit 34 of the main storage system 30-1 controls the access to the original DB data 310 in accordance with an access request from the DBMS 20-1. The access control unit 34 includes the remote copy feature, which transfers the content of the original DB data 310, original checkpoint information 320 and original log 330 to the original storage system 30-2 of the remote system 2 asynchronously with the access of the DBMS 20-1.

The host computer 10-1 stores, in the duplicate storage system 40-1, the copy of the data in the original storage system 30-1 by the mirroring function of an OS 300 or I/F 13. The copy of the data in the original storage system 30-1 is created from the original DB data 310 by the mirroring function, and the copy of the original checkpoint information 320 and the original log 330 is created in the DBMS 20-1.

The duplicate storage system 40-1 has the same configuration as that of the original storage system, and includes a duplicate DB data volume 41 for storing the copy of the original DB data 310 as the duplicate DB data 410, a duplicate checkpoint information volume 42 for storing the copy of the original checkpoint information 320 as the duplicate checkpoint information 420, a duplicate log volume 43 for storing the copy of the original log 330 as the duplicate log 430, and an access control unit 44 that controls these volumes 41 to 43.

The access control unit 44 includes the remote copy feature, which transfers the content of the duplicate DB data 410, duplicate checkpoint information 420, and duplicate log 430 to the duplicate storage system 40-2 of the remote system 2 asynchronously with the mirroring of the host computer 10-1. With the mirroring function, the duplicate storage system 40-1 is synchronized with the main storage system 30-1 when data is written in the database management system 20-1. In other words, data is written in the duplicate storage system 40-1 in synchronization with the data writing of the database management system 20-1.

In Embodiment 1, the main system 1 functions as an active system (first site) that provides database to a client computer, which is not shown in the figure, and the remote system 2 functions as a stand-by system (second site) that backs up the data transferred from the main system 1 asynchronously with the control of the database management system 20-1 or the like and that recovers the database of the main system 1 when the main system 1 fails.

In Embodiment 1, the host computer 10-2 of the remote system 2 needs to operate at least the DB restart processing unit 210 among the functions of the database management system 20-2. The remote system 2 may be configured to activate the function of providing the database (database management unit) in the database management system 20-2 after the main system 1 fails. That is, in the database management system 20-1 of the main system 1, only the database management unit is activated. Then when the database management system (will be referred to as DBMS) 20-1 of the main system 1 fails, the DB restart processing unit 210 and the database management unit are activated in the DBMS 20-2 of the remote system 2.

<Host Computer>

Figure 2:
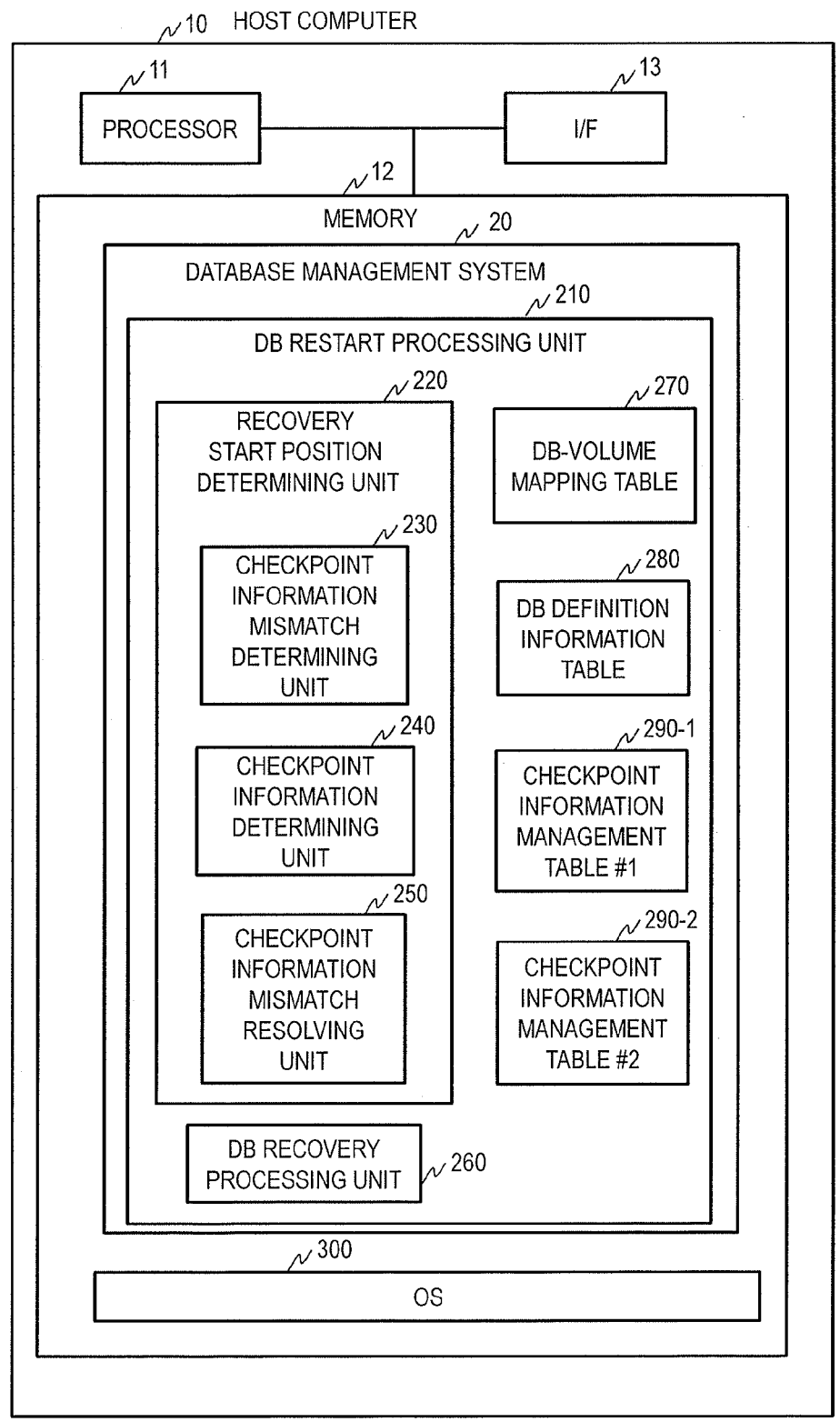
FIG. 2 is a block diagram showing an example of the host computer according to the first embodiment of this invention.

FIG. 2 is a block diagram showing an example of the host computer 10. The host computer 10 includes a processor 11 that conducts a computing process, a memory 12 that holds data and programs, an interface (I/F) 13 coupled to the original storage system 30, the duplicate storage system 40, or an external apparatus via a network.

The DBMS 20 is loaded to the memory 12, and is executed by the processor 11. The DBMS 20 includes the DB restart processing unit 210 that processes the access to the original DB data 310 and that recovers the database (original DB data 310) when the main system 1 fails. As long as the DB restart processing unit 210 is operated in the host computer 10-2 of the remote system 2, the DB restart processing unit 210 may be inactive in the host computer 10-1 of the main system 1.

The DB restart processing unit 210 includes a recovery start position determining unit 220 that determines the recovery position of the original DB data 310 from the original checkpoint information 320, a DB recovery processing unit 260 that recovers the original DB data 310, and various types of tables.

The DB recovery processing unit 260 may recover the original DB data 310 by a known method. In this embodiment, an example of recovering the original DB data 310 from the duplicate log 430 or the original log 330 as in Patent Document 3 above, will be explained, for example.

The recovery start point determining unit 220 includes a checkpoint information mismatch determining unit 230 that detects a discrepancy between the original checkpoint information 320 and the duplicate checkpoint information 420, a checkpoint information determining unit 240 that determines the position of the checkpoint information 420 at which the recovery of the original DB data 310 is to be started, and a checkpoint information mismatch resolving unit 250 that synchronizes the original checkpoint information 320 and the duplicate checkpoint information 420 when the two do not match.

Tables managed by the DB restart processing unit 210 include a DB-volume mapping table 270 that stores therein a relationship between the data to be stored and the volume of the original storage system 30 or the duplicate storage system 40, a DB definition information table 280 that stores therein the configuration of the DBMS 20, a checkpoint information management table #1 (290-1) and a checkpoint information management table #2 (290-2) for managing the original checkpoint information 320 and the duplicate checkpoint information 420.

The respective functions of the DBMS 20 are loaded to the memory 12 as programs. The processor 11 is a function part that provides prescribed functions by conducting a process in accordance with a program of each function. For example, the processor 11 functions as the DB restart processing unit 210 by conducting a process in accordance with the DB restart processing program. The same applies to other programs. The processor 11 also operates as a function part that provides each function of a plurality of processes conducted by each program. The computer and the computer system are apparatus and system that includes these function parts.

Information such as programs and tables for realizing the respective functions of the DBMS 20 can be stored in the original storage system 30, the duplicate storage system 40, a storage apparatus such as a non-volatile semiconductor memory, hard disk drive, and SSD (solid state drive), or a computer-readable non-transitory data recording medium such as IC card, SD card, and DVD.

<Storage System>

Figure 3:
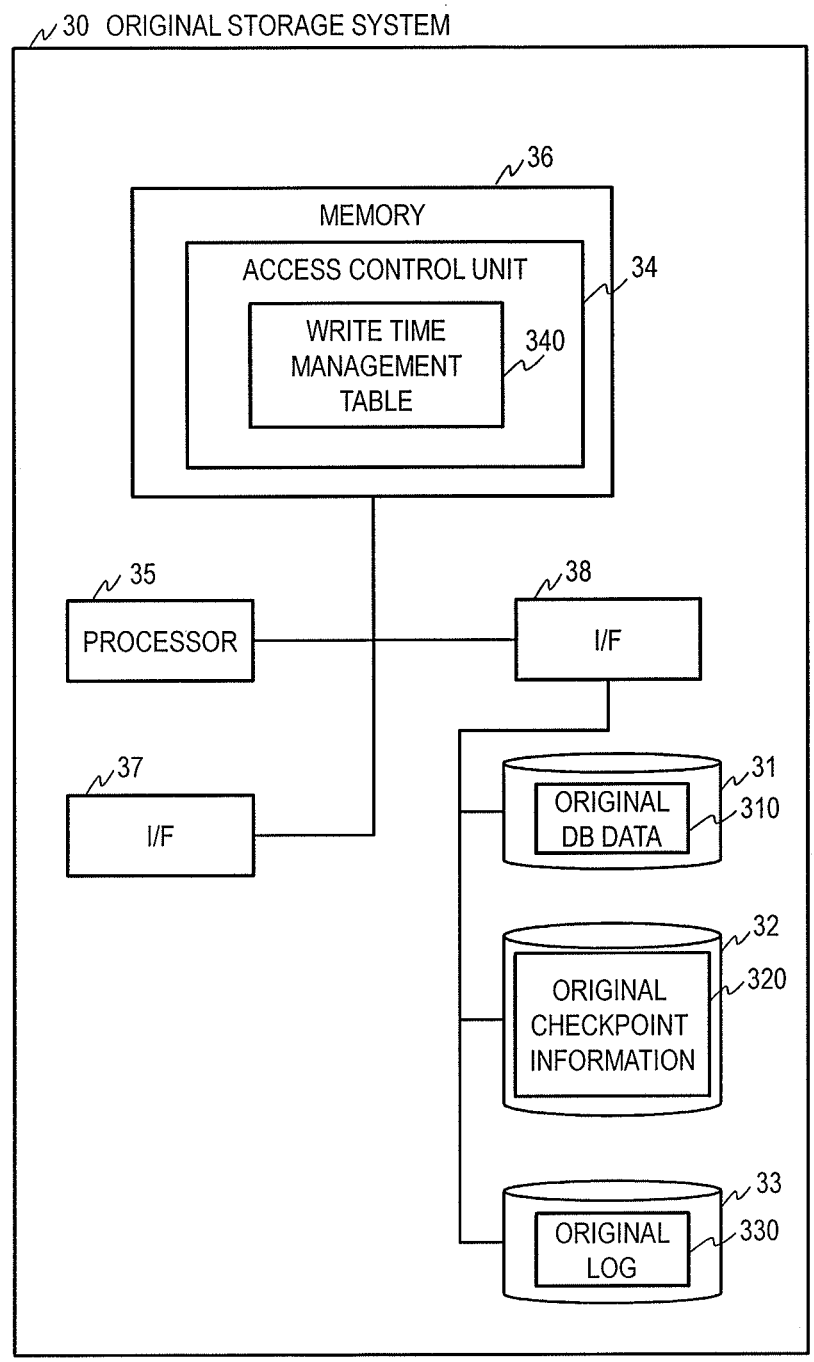
FIG. 3 is a block diagram showing an example of the original storage system according to the first embodiment of this invention.

FIG. 3 is a block diagram showing an example of the original storage system 30. The duplicate storage system 40 has the same configuration and the overlapping descriptions will be omitted.

The original storage system 30 includes a processor 35 that conducts a computing process, a memory 36 that holds data and programs, an I/F 38 coupled to a drive that provides a plurality of volumes, and an interface (I/F) 37 coupled to the host computer 10 or an external apparatus via a network.

The respective volumes 31 to 33 are logical storage areas including at least one disk drive or a non-volatile semiconductor such as SSD. In the example of the figure, the original storage system 30-1 includes the original DB data volume 31 for storing the original DB data 310, the original checkpoint information volume 32 for storing the original checkpoint information 320, and the original log volume 33 for storing the original log 330.

The access control unit 34 that controls the respective volumes 31 to 33 is read into the memory 36 and executed by the processor 35. The access control unit 34 includes a WRITE time management table 340 that stores times at which the last data was written in each volume. The access control unit 34 includes the remote copy feature, and transfers the content of each data to the remote system 2 asynchronously with the access of the DBMS 20-1 and the mirroring function.

With the remote copy function of the access control unit 34, the copy of the original DB data 310, original checkpoint information 320, and original log 330 is transferred from the original storage system 30-1 of the main system 1 to the original storage system 30-2 of the remote system 2 asynchronously with the access of the DBMS 20-1.

The access control unit 44 of the duplicate storage system 40 transfers the copy of the duplicate DB data 410, duplicate checkpoint information 420, and duplicate log 430 from the duplicate storage system 40-1 of the main system 1 to the duplicate storage system 40-2 of the remote system 2 asynchronously with the access of the mirroring function.

<Summary of Processes>

First, the process of the DBMS 20-1 of the main system 1 will be explained. The DBMS 20-1 reads out the data of the original DB data 310 to a DB buffer (or DB cache), which is not shown in the figure, in the memory 12, in response to a request from a client or application not shown in the figure. When the transaction is committed, the DBMS 20-1 generates a log indicating the updating content of the data and stores the data read out to the DB buffer in the original log 330, and the updated data is stored in the original DB data 310.

When generating a log, the DBMS 20-1 gives a log sequence number (will be referred to as LSN below) to the log as an identifier for each log. The DBMS 20-1 of the present invention stores the log including LSN in the original log 330. Next, the DBMS 20-1 stores the updated data in the original DB data 310, which concludes the data updating process.

The checkpoint information 320 is generated in the following manner. The DBMS 20-1 of the main system 1 conducts the checkpoint obtaining process at a prescribed timing. Examples of the prescribed timing include a prescribed interval, when the transaction processing amount reaches a threshold, and when the amount of the original log 330 reaches a prescribed value.

In the checkpoint obtaining process, the DBMS 20-1 writes the updated data on the DB buffer back to the original DB data 310 of the original DB data volume 31. At this time, the DBMS 20-1 obtains the LSN of the data written to the original DB data 310 and writes the LSN into the checkpoint information 320.

The host computer 10-1 stores, in the duplicate storage system 40-1, the copy of the data in the original storage system 30-1 by the mirroring function of an OS 300 or I/F 13. This way, the data written into the original DB data 310 is also written into the duplicate DB data 410. The DBMS 20-1 writes the copy of the original log 330 into the duplicate log 430, and writes the original checkpoint information 320 into the duplicate log checkpoint information 420 for multiplexing.

The original storage system 30-1 of the main system 1 synchronizes the respective volumes 31 to 33 of the remote system 2 with the respective volumes to 33 of the original storage system 30-2 at a prescribed timing asynchronously with the update of the DBMS 20-1. That is, among the original DB data 310, the original checkpoint information 320, and the original log 330, the newly updated data is transferred from the original storage system 30-1 to the original storage system 30-2. Examples of the prescribed timing include when the usage rate of the network 3 is less than a threshold, when the load on the original storage system 30-1 is less than a threshold, and when the access load of each volume 31 to 33 is less than a threshold.

The duplicate storage system 40-1 of the main system 1 is synchronized with the duplicate storage system 40-2 of the remote system 2 at a prescribed timing asynchronously with the mirroring process of the host computer 10-1. That is, among the duplicate DB data 410, the duplicate checkpoint information 420, and the duplicate log 430, the newly updated data is transferred from the duplicate storage system 40-1 to the duplicate storage system 40-2. As described above, examples of the prescribed timing include when the usage rate of the network 3 is less than a threshold, when the load on the duplicate storage system 40-1 is less than a threshold, and when the access load of each volume 41 to 43 is less than a threshold.

When an abnormality occurs, the DBMS 20-1 of the main system 1 writes the information indicating the presence of abnormality in the main checkpoint information 320 such as "FAULT" as shown in FIG. 4. That is, in the end or middle of the LSN, the information indicating the state of the DBMS 20-1 of the main system 1 is stored.

When a failure of the DBMS 20-1 of the main system 1 is detected, the DB restart processing unit 210 recovers the original DB data 310 from the original log 330 or the duplicate log 430 of the remote system 2.

In the present invention, as described above, the log recovery start position is determined using the checkpoint information, thereby ensuring the redundancy of the database system in which the copy of the main system 1 is stored in the remote system 2 asynchronously with the DBMS 20-1.

The DBMS 20-2 of the remote system 2 then starts delivering the database on behalf of the failed main system 1. A known method can be employed for the method to recover the original DB data 310 based on the log, and the technology of Patent Document 3 described as a conventional example can be used, for example.

In the host computer 10-2, the DBMS 20-2 starts delivering the database.

With the process described above, the copy of the original DB data 310, original log 330, and original checkpoint information 320 can be transferred to the remote system 2 asynchronously with the update of the DBMS 20-1. Then as described below, by determining the position of the log at which the original DB data 310 is to be recovered, it is possible to recover the database accurately.

The monitoring of the DBMS 20-1 of the main system 1 by the DB restart processing unit 210 of the DBMS 20-2 of the remote system 2 is not limited to monitoring the original checkpoint information 320 of the original storage system 30-2 for the information indicating the presence of failure, but also includes monitoring the heartbeat of the host computer 10-1 or the DBMS 20-1, or monitoring the communication state of the network 3 to detect a failure of the main system 1.

FIG. 4 is a diagram showing a relationship between the original log 330 and the original checkpoint information 320. The original log 330 includes, in one record, LSN 331 in which the log sequence number given by the main system 1 is stored, the transaction identifier 332 in which an identifier for each transaction corresponding to the log is stored, the log type 333 indicating the type of the log, the data identifier 334 in which an identifier for the original DB data 310 corresponding to the log is stored, the pre-update data 335 in which the value of the data identifier before the update is stored, and the post-update data 336 in which the value of the data identifier after the update is stored. The LNS 331 is an identifier used to determine the position of the original log 330 when the updated database data is written into the original storage system 30-1.

The value of the LSN 331 and the state information written by the DBMS 20-1 of the original log 330 are stored in the LSN 321 in the original checkpoint information 320.

In the figure, "50" and "100" are the values of the LSN 331 of the original log 330, and "DBSTART" is the information indicating the start of the operation written in the original log 330 by the DBMS 20-1. Also, in the figure "DBEND" is the information indicating the normal termination, which was written in the original log 330 by the DBMS 20-1. Thus, if the information indicating the normal termination is not stored in the original checkpoint information 320, then the DBMS 20-1 was not terminated normally.

In the log type 333, "START" in the figure is a message indicating the start of the transaction T, which is written by the DBMS 20-1. "UPDATE" is a log indicating the update of the data, and "COMMIT" is a log indicating a completion of the transaction.

"CP START" is a message indicating the start of the checkpoint obtaining process, which is written by the DBMS 2-1 at a prescribed interval. "CP END" is a message written in by the DBMS 20-1 when the checkpoint obtaining process is completed.

The DBMS 20-1 is configured to write the checkpoint information at a prescribed interval even when there is no update or addition of data or completion of transaction, thereby making it possible to generate the checkpoint information during a period in which no original DB data 310 is added or updated.

FIG. 5 is a diagram showing an example of the DB-volume mapping table 270. The DB-volume mapping table 270 includes, in one record, the DB area ID 271 for storing the area names of the storage systems 30 and 40 in which the data is stored, the system 272 for storing the system (original or duplicate) of the storage system that stores the data, the type 273 for storing the type of the data, the main system storage system ID 274 for storing an identifier of the storage system of the main system 1 in which the data is stored, the main system logical volume ID 275 for storing an identifier of the volume of the main system 1 in which the data is stored, the remote system storage system ID 276 for storing an identifier of the storage system of the remote system 2 in which the data is stored, and the remote system logical volume ID 277 for storing an identifier of the volume of the remote system 2 in which the data is stored.

In the DB-volume mapping table 270, the respective volumes of the main system 1 and the remote system 2 have a relationship of asynchronous copy, and this means that the copy of the data of each volume is transferred from the main system storage system ID 274 to the remote system storage system ID 276.

Each value of the DB-volume mapping table 270 is configured by an administrator of the database system or the like in advance. In the figure, under the system 272, the main system 1 is configured to "original," and the remote system 2 is configured to "duplicate."

In the example of the figure, the ID of the original storage system 30-1 of the main system 1 is "CTL#A1", and the ID of the duplicate storage system 40-1 is "CTL#A2." The ID of the original storage system 30-2 of the remote system 2 is "CTL#B1", and the ID of the duplicate storage system 40-2 is "CTL#B2."

FIG. 6 is a diagram showing an example of a DB definition information table 280. The DB definition information table 280 includes, in one record, the parameter 281 and the value 282.

The example of the figure shows the DB definition information table 280 of the DBMS 20-2 of the remote system 2, and in the first record, the parameter 281 is configured to a WRITE time obtaining mode for specifying whether a WRITE time is to be obtained or not, and the value 282 is configured to "N." The WRITE time is a time at which the data is written in the remote system 2 by the storage system of the main system 1. This example shows that the remote system 2 does not obtain data from the WRITE time management table 340 of the main system 1.

In the example of the figure, in the second record, the parameter 281 is configured to a mirrored volume synchronization function utilization mode, and the value 282 is configured to "N." This function indicates whether the function of synchronizing (copying) the content of the respective mirrored volumes is to be used or not. "N" in the figure means that such a function is not to be used.

Although not shown in the figure, the DBMS 20-1 of the main system 1 also includes the DB definition information table 280, and it is possible to configure whether the function of synchronizing (copying) the content of the respective mirrored volumes is to be used or not.

The DB definition information table 280 includes information indicating one of the main system 1 and the remote system 2, although not shown in the figure. For example, if the parameter 281 is "site," and the value 282 is "remote," this indicates the DBMS 20-2 of the remote system 2.

FIG. 7 is a diagram showing an example of a checkpoint information management table #1 (290-1). The checkpoint information management table #1 (290-1) includes, in one record, the checkpoint information ID 291 for storing an identifier of the checkpoint information, the system 292 for storing the system (original or duplicate) of the storage system in which the checkpoint information is stored, the type 293 for storing the type of the data, the LSN 294 for storing the latest value of the LSN of the checkpoint information, and a checkpoint information selecting flag 295 indicating the checkpoint information is selected when the original DB data 310 is recovered.

The example of the figure shows that, in the checkpoint information management table #1 of the DBMS 20-2 in the remote system 2, the LSN 294 of the original checkpoint information 320 (CHKPNT1) is "90," and for the checkpoint information in which the LSN 294 of the duplicate checkpoint information 420 (CHKPNT2) is "85," and the system 292 is "duplicate," the checkpoint information selecting flag 295 is "ON." This means that the duplicate checkpoint information 420 is selected for the recovery of the original DB data 310.

FIG. 8 is a diagram showing an example of a checkpoint information management table #2 (290-2). The checkpoint information management table #2 (290-2) includes, in one record, the checkpoint information ID 291 for storing an identifier of the checkpoint information, the system 292 for storing the system (original or duplicate) of the storage system in which the checkpoint information is stored, the type 293 for storing the type of the data, the storage system ID 296 for storing an identifier of the storage system in which the checkpoint information is stored, the logical volume ID 297 for storing an identifier of the logical volume in which the checkpoint information is stored, the main system WRITE time 298 for storing the time at which the checkpoint information was written in the main system 1, and the checkpoint information selecting flag 295 indicating the checkpoint information is selected when the original DB data 310 is recovered.

The example of the figure shows that, in the checkpoint information management table #2 of the DBMS 20-2 in the remote system 2, the main system WRITE time 298 of the original checkpoint information 320 (CHKPNT1) is "14:50," and for the checkpoint information in which the main system WRITE time 298 of the duplicate checkpoint information 420 (CHKPNT2) is "14:40," and the system 292 is "duplicate," the checkpoint information selecting flag 295 is "ON." This means that the duplicate checkpoint information 420 is selected for the recovery of the original DB data 310.

The checkpoint information management tables #1 and #2 shown in FIGS. 7 and 8 above are updated by the DBMS 20. The DBMS 20-2 of the remote system 2 updates the checkpoint information management tables #1 (290-1) and #2 (290-2) with the process described below.

The checkpoint information management table #1 (290-1) is updated by storing the LSNs of the original checkpoint information 320 and duplicate checkpoint information 420 under the LSN 294, respectively.

On the other hand, the checkpoint information management table #2 (290-2) is updated by receiving, at the remote system 2, the information of the WRITE time in the main system 1 when the data is transferred from the main system 1 asynchronously, and by storing the final writing times of the original checkpoint information 320 and the duplicate checkpoint information 420 under the main system WRITE time 298, respectively.

FIGS. 9A to 9D are diagrams showing an example of the WRITE time management table 340 of each of the storage systems 30 and 40. FIG. 9A is a WRITE time management table 340-1 of the original storage system 30-1 of the main system 1. FIG. 9B is a WRITE time management table 340-2 of the duplicate storage system 40-1 of the main system 1. FIG. 9C is a WRITE time management table 340-3 of the original storage system 30-2 of the remote system 2. FIG. 9D is a WRITE time management table 340-4 of the duplicate storage system 40-2 of the remote system 2.

Each WRITE time management table 340 includes the logical volume ID 341 for storing an identifier of a logical volume of each storage system, and the time (time stamp) at which the last data was written in each logical volume.

When the data is written in each volume, the access control unit 34 of each storage system stores the time at which the data writing was completed in the WRITE time 342 of the record of the corresponding volume.

Figure 10:
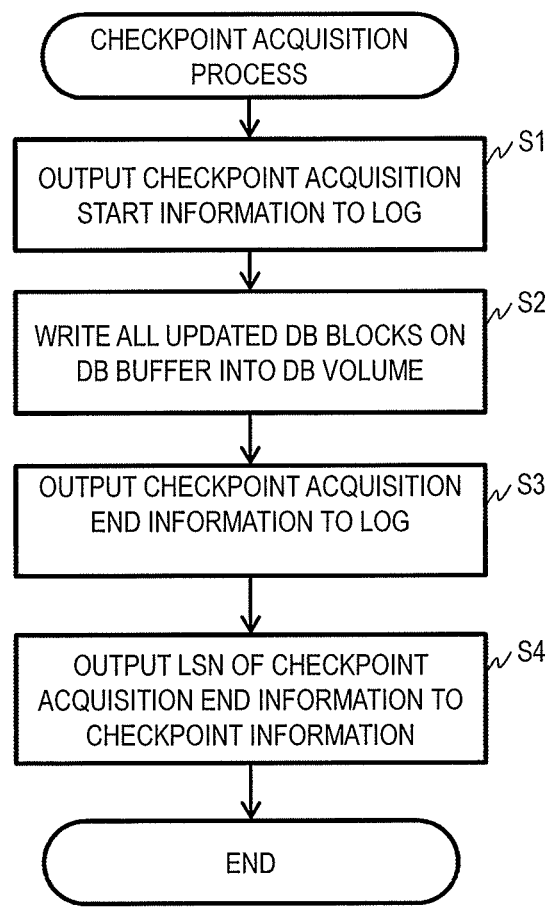
FIG. 10 is a flowchart showing an example of the checkpoint obtaining process according to the first embodiment of this invention.

FIG. 10 is a flowchart showing an example of the checkpoint obtaining process. This process is conducted at a prescribed timing of the DBMS 20-1 of the main system 1. As described above, examples of the prescribed timing include a prescribed interval, when the transaction processing amount reaches a threshold, and when the amount of the original log 330 reaches a prescribed value.

First, the DBMS 20-1 outputs "CP START" to the original log 330 as the checkpoint information acquisition start information (51). The DBMS 20-1 gives an LSN to the checkpoint acquisition start information in a manner similar to the log of the original DB data 310.

Next, the DBMS 20-1 writes all updated data on the DB buffer (all DB blocks) in the original DB data volume 31 (S2).

The DBMS 20-1 outputs "CP END" to the original log 330 as the checkpoint acquisition end information (S3). The DBMS 20-1 gives an LSN to the checkpoint acquisition end information in a manner similar to above.

Lastly, the DBMS 20-1 writes, in the original checkpoint information 320, the LSN given to the checkpoint acquisition end information.

With the process described above, at a prescribed timing, updated data on the DB buffer is written in the original DB data 310, and the LSN added to the checkpoint acquisition end information is written in the original checkpoint information volume 32 as the original checkpoint information 320. The original checkpoint information 320 of the main system 1 is copied to the original checkpoint information 320 of the remote system 2 asynchronously with the writing of the DBMS 20-1.

The original DB data 310 of the main system 1 is also copied to the original DB data 310 of the remote system 2 asynchronously with the writing of the DBMS 20-1.

Figure 11:
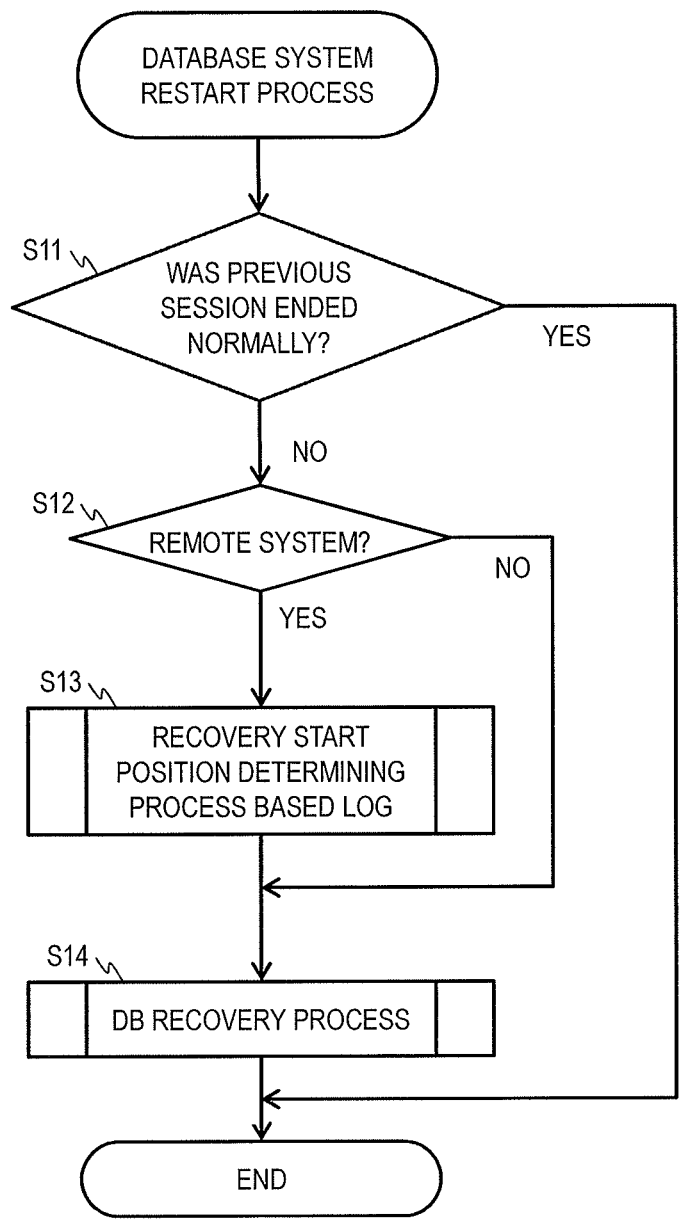
FIG. 11 is a flowchart showing an example of a process conducted by the DB restart processing unit according to the first embodiment of this invention.

FIG. 11 is a flowchart showing an example of a process conducted by the DB restart processing unit 210. This process is conducted when the operation is switched from the main system 1 to the remote system 2, and the DBMS 20-2 of the remote system 2 is activated. A known technology can be employed to switch the operation from the main system 1 to the remote system 2. Examples of such a technology include a configuration in which the host computer 10-2 of the remote system 2 monitors the heartbeat of the host computer 10-1 of the main system 1, and when failure is detected, the DBMS 20-2 is activated.

The DB restart processing unit 210 reads out the original checkpoint information 320 of the original storage system 30-2, and determines whether the database of the main system 1 was normally terminated. When the main checkpoint information 320 does not contain information indicating the normal termination of the DBMS 20-1, the DB restart processing unit 210 determines that the DBMS 20-1 was not normally terminated, and the process moves to Step S12. Otherwise, the process is ended.

In Step S12, the DB restart processing unit 210 refers to the DB definition information table 280 to determine whether the subject system is the remote system 2 or not. If the subject system is the remote system 2, the process moves to Step S13 where the process to determine the recovery start position from the log is conducted. Meanwhile, if the subject system is the main system 1, the process moves to Step S14 where the DB recovery processing unit 260 conducts the recovery process of the original DB data 310 based on the log.

The DB recovery processing unit 260 conducts the recovery process by applying the original log 330 or the duplicate log 430 to the original DB data 310 of the original DB data volume 31 or the duplicate DB data 410 of the duplicate DB data volume 41, based on the LSN or WRITE time of the checkpoint information selected in Step S13. A log corresponding to a newer one of the original checkpoint information 320 and the duplicate checkpoint information 420 is selected. For example, the DB recovery processing unit 260 conducts the recovery process by referring to the LSN 294 of the checkpoint information management table #1 (290-1), selecting the checkpoint information with a larger value (original checkpoint information 320 in the example of the figure), and selecting the original log 330 (or duplicate log 430) corresponding to the checkpoint information. When the recovery process is controlled by the storage layer (original storage system 30-2 and the duplicate storage system 40-2), the DB recovery processing unit 260 selects the checkpoint information with a newer value of the main system WRITE time 298 in the checkpoint information management table #2 (290-2), and selects the original log 330 or the duplicate log 430 corresponding to the checkpoint information.

That is, when the DBMS 20-2 of the remote system 2 detects an abnormality in the main system 1, both the main and duplicate log, checkpoint information, and DB data have already been copied from the main system 1 to the remote system 2 asynchronously with the DBMS 20-1 of the main system 1, and therefore, first, it is necessary to determine the position of the log at which the original DB data 310 is to be recovered (S13). The process of Step S13 will be explained in detail with reference to FIG. 12.

Then the DB restart processing unit 210 of the DBMS 20-2 recovers the original DB data 310 and the duplicate DB data 410 from the determined recovery start position of the log, and after the recovery is completed, the database delivery is started.

When restarting the database, the mirroring function of the OS 300 or I/F 13 is utilized. By synchronizing the original storage system 30-2 with the duplicate storage system 40-2 using this mirroring function, the redundancy of the database system in the remote system 2 is ensured.

Figure 12:
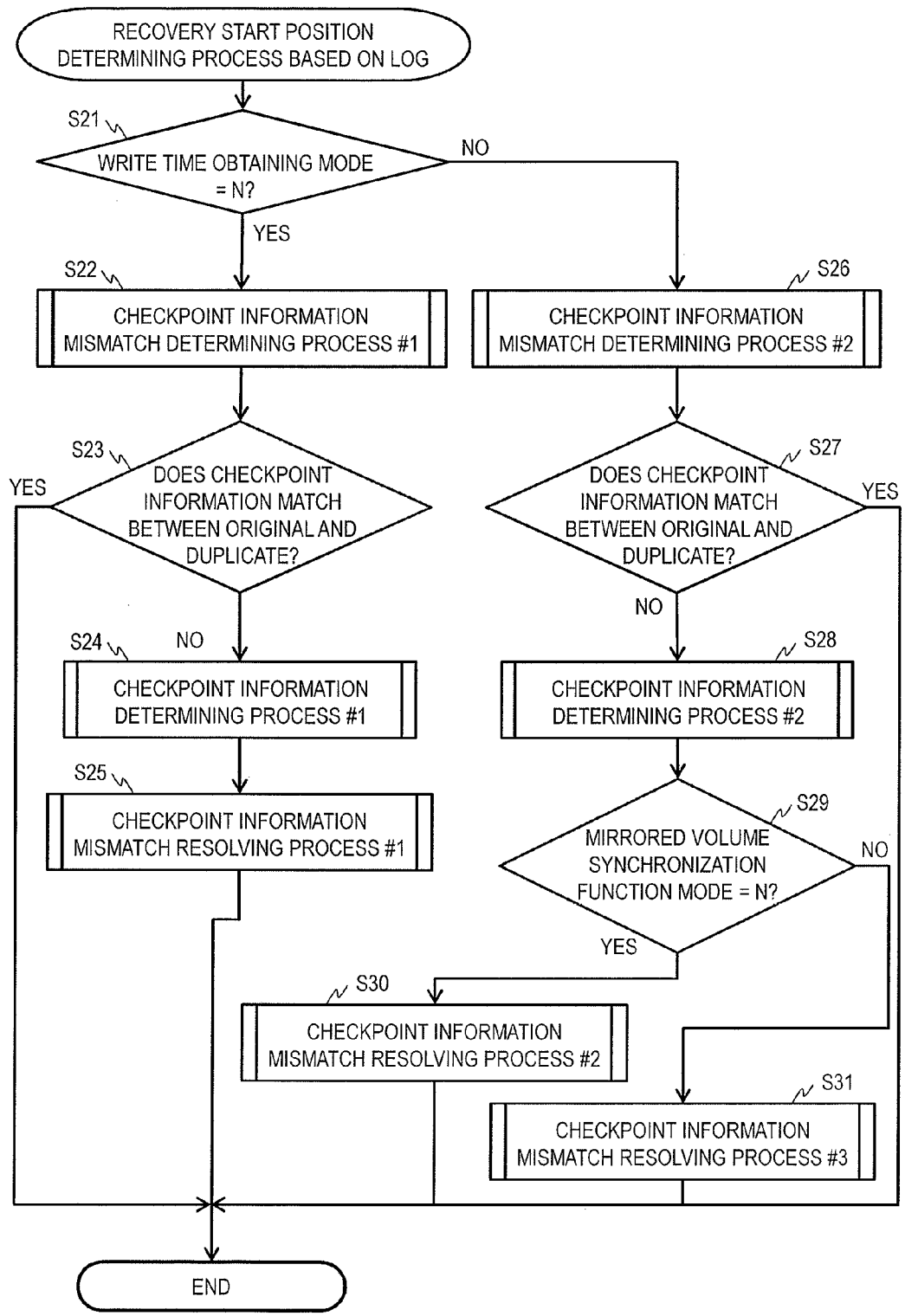
FIG. 12 is a flowchart showing an example of the process to determine the recovery start position from the log according to the first embodiment of this invention.

FIG. 12 is a flowchart showing an example of the process to determine the recovery start position from the log. This process is conducted in Step S13 of FIG. 11.

Figure 13A:
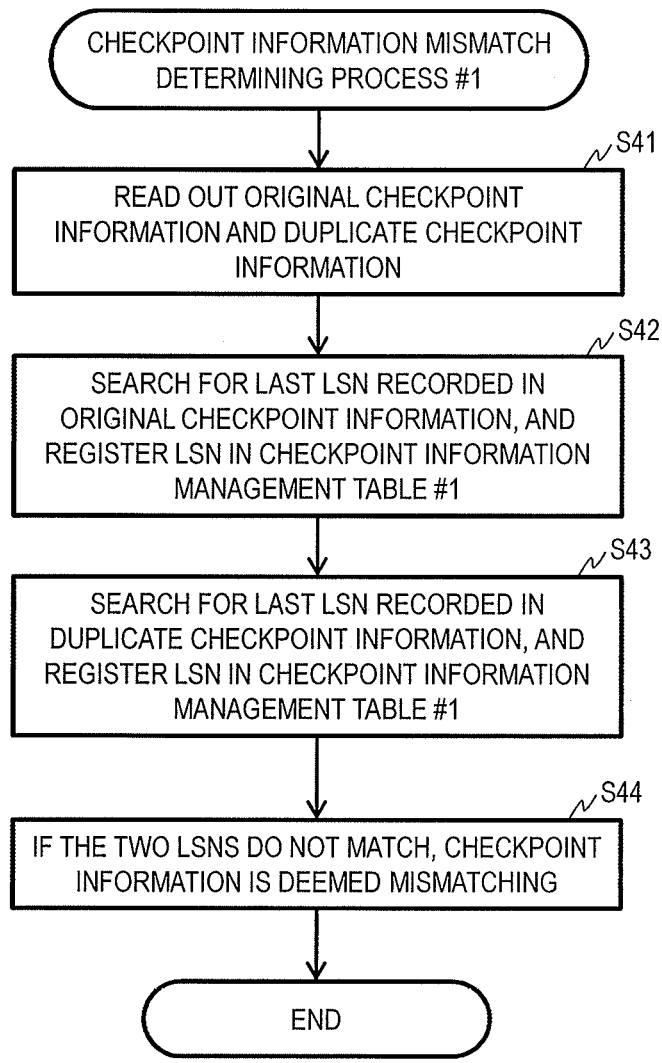
FIG. 13A is a flowchart showing an example of the checkpoint information mismatch determining process #1 according to the first embodiment of this invention.
Figure 13B:
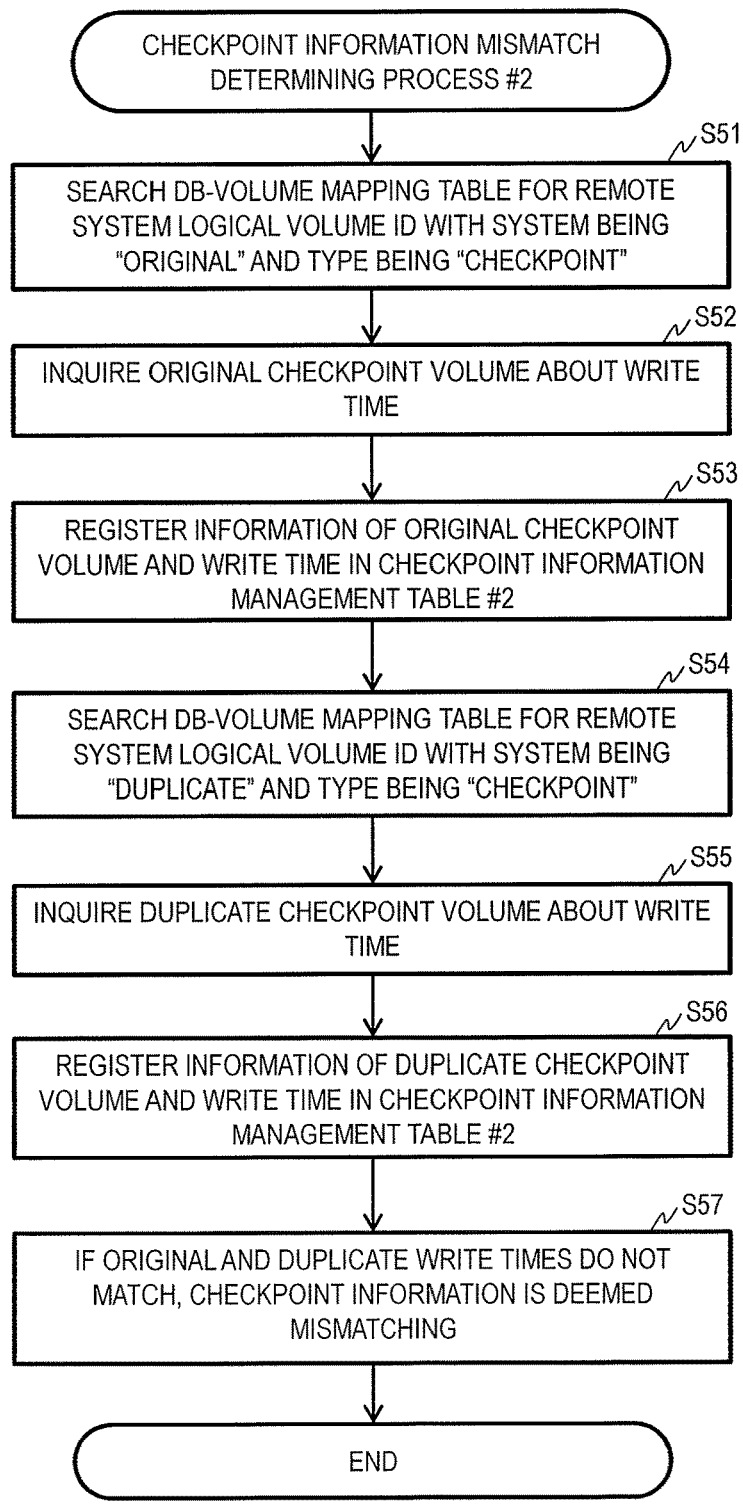
FIG. 13B is a flowchart showing an example of the checkpoint information mismatch determining process #2 according to the first embodiment of this invention.

The DB restart processing unit 210 of the DBMS 20-2 refers to the DB definition information table 280 to obtain the value 282 of the WRITE time obtaining mode. The DB restart processing unit 210 then determines whether the value 282 of the WRITE time obtaining mode is "N" or not. If the WRITE time obtaining mode is "N," the process moves to Step S22, and if not, the process moves to Step S26. That is, if the DB restart processing unit 210 does not use the WRITE time of the DBMS 20-1 of the main system 1, the checkpoint information mismatch determining process #1 shown in FIG. 13A is conducted in Step S22. On the other hand, if the DB restart processing unit 210 uses the WRITE time of the DBMS 20-1 of the main system 1, the checkpoint information mismatch determining process #2 shown in FIG. 13B is conducted in Step S26.

Figure 14A:
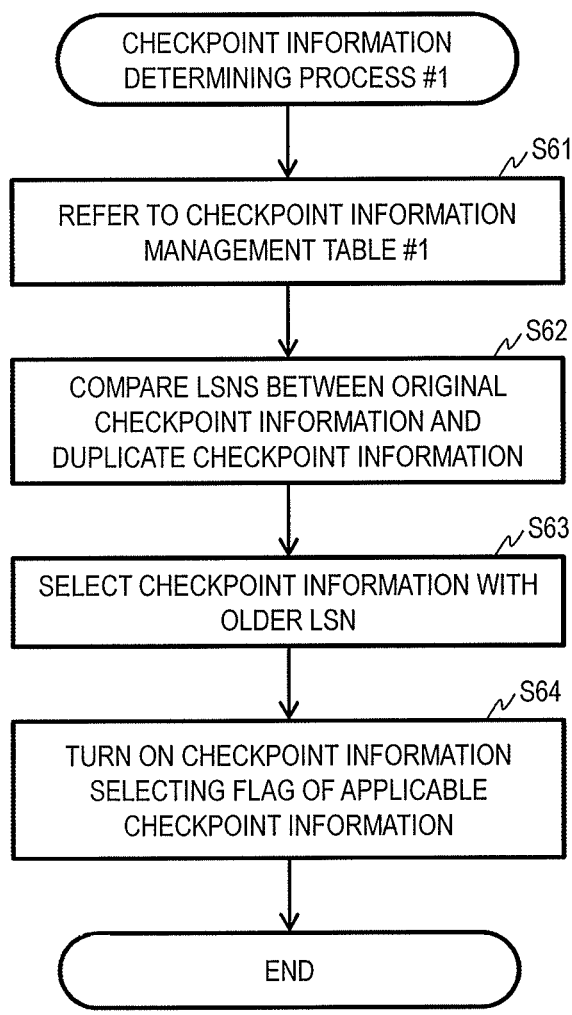
FIG. 14A is a flowchart showing an example of the checkpoint information determining process #1 according to the first embodiment of this invention.

In Step S22, the DB restart processing unit 210 conducts the checkpoint information mismatch determining process #1, and determines whether the values of the LSNs coincide with each other between the original checkpoint information 320 and the duplicate checkpoint information 420. If the LSNs of the original checkpoint information 320 and the duplicate checkpoint information 420 coincide with each other, the DB restart processing unit 210 ends the process. If the LSNs of the original checkpoint information 320 and the duplicate checkpoint information 420 do not coincide with each other, the process moves to Step S24 where the checkpoint information determining process of FIG. 14A is conducted.

In the checkpoint information determining process #1 of Step S24, the DB restart processing unit 210 refers to the checkpoint information management table #1 (290-1), and selects one of the original checkpoint information 320 and the duplicate checkpoint information 420 including an older (smaller) LSN as the checkpoint information to be used to recover the original DB data 310.

Next, in Step S25, the DB restart processing unit 210 conducts the checkpoint information mismatch resolving process #1 so that the checkpoint information not used for the recovery of DB is cleared.

Then the process returns to FIG. 11, and in Step S14, the DB restart processing unit 210 applies the original log 330 or the duplicate log 430 corresponding to the checkpoint information with a newer LSN or main system WRITE time to the original DB data 310 and the duplicate DB data 410, thereby recovering the original DB data 310 and the duplicate DB data 410.

On the other hand, in Step S21, if the WRITE time obtaining mode of the DB definition information table 280 is "Y," the process moves to Step S26 where the DB restart processing unit 210 conducts the checkpoint information mismatch determining process #2 of FIG. 13B.

In the checkpoint information determining process #2 of Step S26, the DB restart processing unit 210 refers to the checkpoint information management table #2 (290-2), and determines whether the main system WRITE times 298 of the original checkpoint information 320 and the duplicate checkpoint information 420 coincide with each other or not.

Figure 14B:
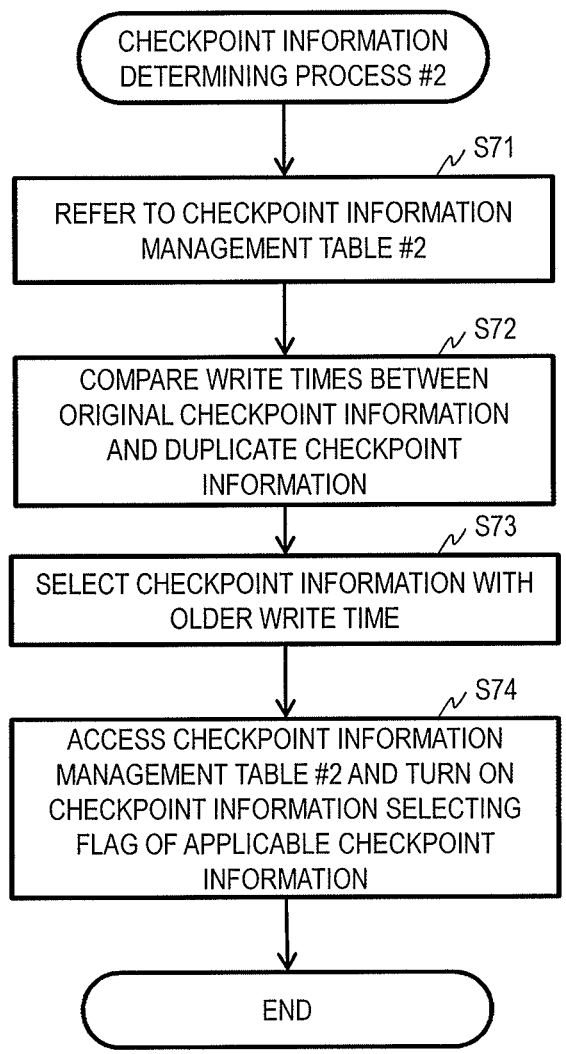
FIG. 14B is a flowchart showing an example of the checkpoint information determining process #2 according to the first embodiment of this invention.

If the WRITE times of the original checkpoint information 320 and the duplicate checkpoint information 420 coincide with each other, the DB restart processing unit 210 ends the process. If the WRITE times of the original checkpoint information 320 and the duplicate checkpoint information 420 do not coincide with each other, the process moves to Step S28 where the checkpoint information determining process #2 of FIG. 14B is conducted.

In the checkpoint information determining process #2 of Step S28, the DB restart processing unit 210 refers to the checkpoint information management table #1 (290-2), and selects one of the original checkpoint information 320 and the duplicate checkpoint information 420 including an older WRITE time as the checkpoint information to be used to recover the main DB data 310.

Next, in Step S29, the DB restart processing unit 210 refers to the DB definition information table 280, and determines whether the value 282 of the mirrored volume synchronizing mode is "N" or not. If "N," which means that the original storage system 30-2 and the duplicate storage system 40-2 are not synchronized, the process moves to Step S30 where the DB restart processing unit 210 conducts the checkpoint information mismatch resolving process #2 of FIG. 15B.

Figure 15A:
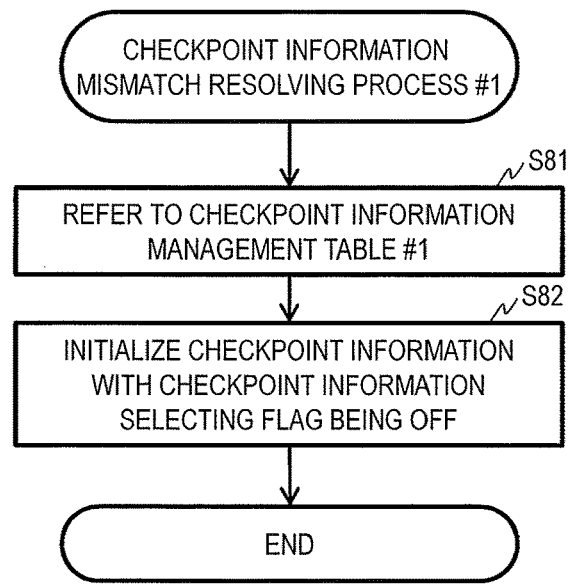
FIG. 15A is a flowchart showing an example of the checkpoint information mismatch resolving process #1 according to the first embodiment of this invention.
Figure 15B:
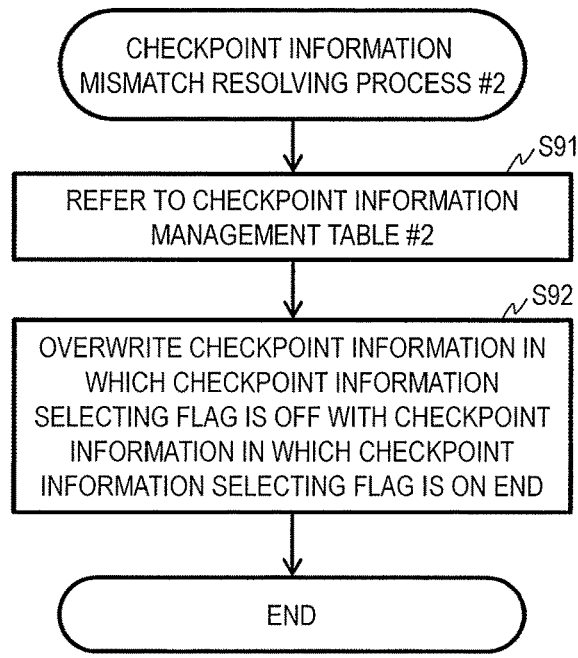
FIG. 15B is a flowchart showing an example of the checkpoint information mismatch resolving process #2 according to the first embodiment of this invention.
Figure 15C:
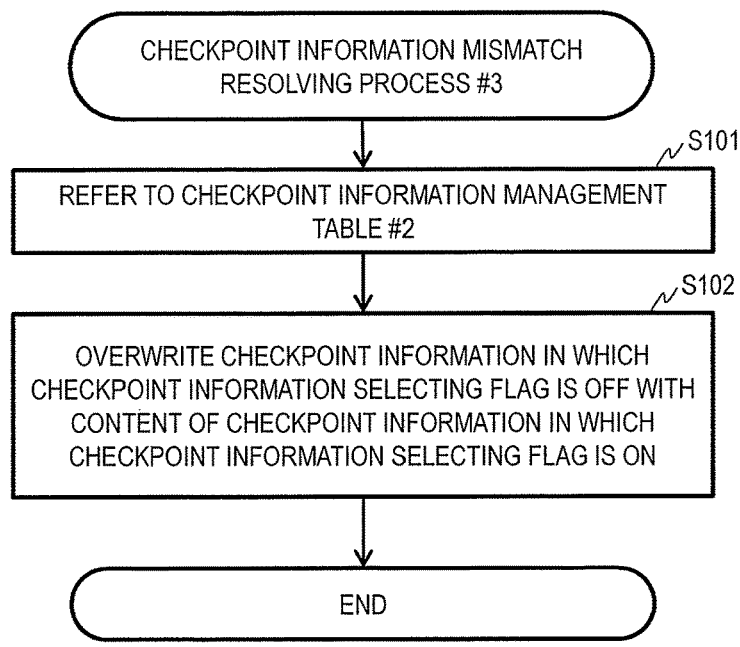
FIG. 15C is a flowchart showing an example of the checkpoint information mismatch resolving process #3 according to the first embodiment of this invention.

If "Y," which means that the original and duplicate storage systems of the main system 1 and the remote system 2 are synchronized, the process moves to Step S31 where the DB restart processing unit 210 conducts the checkpoint information mismatch resolving process #3 of FIG. 15C.

With the process described above, a volume including the original checkpoint information 320 and the duplicate checkpoint information 420 with an older LNS or WRITE time is selected, and the DB restart processing unit 210 recovers the original DB data 310 using the original log 330 or the duplicate log 440 specified by the LSN.

As described above, using one of the original checkpoint information 320 and the duplicate checkpoint information 420 including a newer LSN or WRITE time, which were received from the main system 1 asynchronously with the DBMS 20-1, even if there is a discrepancy between the original DB data 310 and the duplicate DB data due to the asynchronous transfer, the two can be made consistent with each other without causing data loss. This makes it possible to ensure the redundancy when the data is backed up from the main system 1 to the remote system 2 asynchronously with the DBMS 20-1 of the main system 1. Also, it is possible to prevent an increase in time between the failure occurrence in the main system 1 and the recovery of the database in the remote system 2.

FIG. 13A is a flowchart showing an example of the checkpoint information mismatch determining process #1. This process is conducted by the checkpoint information mismatch determining unit 230 of the recovery start position determining unit 220 in Step S22 of FIG. 12.

The checkpoint information mismatch determining unit 230 reads out the last (latest) original checkpoint information 320 stored in the volume 32 of the original storage system 30-2 and the last (latest) duplicate checkpoint information 420 stored in the volume 42 of the duplicate storage system 40-2 (S41).

The checkpoint information mismatch determining unit 230 obtains the LSN of the last original checkpoint information 320, and stores the obtained LSN in the LSN 294 of a record with the system 292 being "original" in the checkpoint information management table #1 (S42).

The checkpoint information mismatch determining unit 230 obtains the LSN of the last duplicate checkpoint information 420, and stores the obtained LSN in the LSN 294 of a record with the system 292 being "duplicate" in the checkpoint information management table #1 (S43).

If the values of the LSN 294 with the system 292 being "original" and the LSN 294 with the system 292 being "duplicate" do not coincide with each other, the checkpoint information mismatch determining unit 230 determines that the LSNs of the original checkpoint information 320 and the duplicate checkpoint information 420 do not match (S44).

With the process described above where the checkpoint information mismatch determining unit 230 compares LSNs of the original checkpoint information and duplicate checkpoint information, a discrepancy between the original and duplicate checkpoint information backed up asynchronously with the DBMS 20-1 of the main system 1 can be detected.

FIG. 13B is a flowchart showing an example of the checkpoint information mismatch determining process #2. This process is conducted by the checkpoint information mismatch determining unit 230 of the recovery start position determining unit 220 in Step S26 of FIG. 12.

The checkpoint information mismatch determining unit 230 refers to the DB-volume mapping table 270 and searches for a remote system logical volume ID with the system 272 being "original" and the type 273 being "checkpoint" (S51). VOL3-B1 under the remote logical volume ID 277 of FIG. 5 is the target volume ID. This logical volume ID=VOL3-B1 corresponds to the original checkpoint information volume 32 of the original storage system 30-2 of FIG. 1, and stores therein the original checkpoint information 320.

The checkpoint information mismatch determining unit 230 inquires the host computer 10-1 of the main system 1 about a time (WRITE time) at which the last original checkpoint information 320 was written in the main system 1 (S52).

That is, the checkpoint information mismatch determining unit 230 obtains the main system logical volume ID 275 (VOL3-A1 in this example) with the record of the logical volume ID=VOL3-B1, which was found in Step S51), and inquires the host computer 10-1 about the WRITE time thereof. This inquiry process will be explained in detail with reference to FIG. 16 below.

When receiving the WRITE time from the host computer 10-1 of the main system 1, the DB restart processing unit 210 stores the received WRITE time in the main system WRITE time 298 of a record with the system 292 being "original" in the checkpoint information management table #2 (S53).

The DB restart processing unit 210 refers to the DB-volume mapping table 270 and searches for a remote system logical volume ID with the system 272 being "duplicate" and the type 273 being "checkpoint" (S54). VOL3-B2 under the remote system logical volume ID 277 of FIG. 5 is the target volume ID. This logical volume ID=VOL3-B2 corresponds to the duplicate checkpoint information volume 42 of the duplicate storage system 40-2 of FIG. 1, and stores therein the duplicate checkpoint information 420.

The DB restart processing unit 210 inquires the host computer 10-1 of the main system 1 about a time (WRITE time) at which the last duplicate checkpoint information 420 was written in the main system 1 (S55).

That is, the DB restart processing unit 210 obtains the main system logical volume ID 275 (VOL3-A2 in this example) with the record of the logical volume ID=VOL3-B2, which was found in Step S55, and inquires the host computer 10-1 about the WRITE time thereof. This inquiry process is the same as that in S52 above and will be explained in detail with reference to FIG. 16 below.

When receiving the WRITE time from the host computer 10-1 of the main system 1, the DB restart processing unit 210 stores the received WRITE time in the main system WRITE time 298 of a record with the system 292 being "duplicate" in the checkpoint information management table #2 (S56).

If the main system WRITE time 298 with the system 292 being "original" and the main system WRITE time 298 with the system 292 being "duplicate" do not coincide with each other, the DB restart processing unit 210 determines that the WRITE times of the original checkpoint information 320 and the duplicate checkpoint information 420 do not match (S57).

With the process described above where the WRITE times of the last original checkpoint information and duplicate checkpoint information are compared, a discrepancy between the original and duplicate checkpoint information backed up asynchronously with the DBMS 20-1 of the main system 1 can be detected.

FIG. 14A is a flowchart showing an example of the checkpoint information determining process #1. This process is conducted by the checkpoint information determining unit 240 of the recovery start position determining unit 220 in Step S24 of FIG. 12.

The checkpoint information determining unit 240 refers to the checkpoint information management table #1 (290-1) (S61), and compares the values of the LSN 294 of the original checkpoint information 320 and the LSN 294 of the duplicate checkpoint information 420 (S62).

Then the checkpoint information determining unit 240 selects the checkpoint information with an older (smaller) LSN 294 in the checkpoint information management table #1 for the checkpoint information used to recover the original DB data 310 and the duplicate DB data 410 (S63). The checkpoint information determining unit 240 turns on the checkpoint information selecting flag 295 for the selected checkpoint information in the checkpoint information management table #1. The default value of the checkpoint information selecting flag 295 is "OFF."

With the process described above, the checkpoint information with a smaller LSN is selected, and the checkpoint information selecting flag 295 is updated to "ON."

FIG. 14B is a flowchart showing an example of the checkpoint information determining process #2. This process is conducted by the checkpoint information determining unit 240 in Step S28 of FIG. 12.

The checkpoint information determining unit 240 refers to the checkpoint information management table #2 (290-2) (S71), and compares the values of the main system WRITE time 298 of the original checkpoint information 320 and the main system WRITE time 298 of the duplicate checkpoint information 420 (S72).

Then the checkpoint information determining unit 240 selects the checkpoint information with an older main system WRITE time 298 in the checkpoint information management table #2 for the checkpoint information used to recover the original DB data 310 and the duplicate DB data 410 (S73). The checkpoint information determining unit 240 turns on the checkpoint information selecting flag 295 for the selected checkpoint information in the checkpoint information management table #2 (S74). The default value of the checkpoint information selecting flag 295 is "OFF."

With the process described above, when the WRITE time obtaining mode is "Y" in the DB definition information table 280, the checkpoint information including an older main system WRITE time 298 is selected, and the checkpoint information selecting flag 295 is updated to "ON" in the checkpoint information management table #2.

FIG. 15A is a flowchart showing an example of the checkpoint information mismatch resolving process #1. This process is conducted by the checkpoint information mismatch resolving unit 250 of the recovery start position determining unit 220 in Step S25 of FIG. 12.

The checkpoint information determining unit 240 refers to the checkpoint information management table #1 (290-1) (S81), and initializes the checkpoint information in which the checkpoint information selecting flag 295 is "OFF" (S82).

With the process described above, the checkpoint information not used for the recovery process of the original DB data 310 is cleared by the initialization.

FIG. 15B is a flowchart showing an example of the checkpoint information mismatch resolving process #2. This process is conducted by the checkpoint information mismatch determining unit 250 of the recovery start position determining unit 220 in Step S30 of FIG. 12.

The checkpoint information mismatch resolving unit 250 refers to the checkpoint information management table #2 (290-2) (S91), and overwrites the checkpoint information in which the checkpoint information selecting flag 295 is "OFF" with the checkpoint information in which the checkpoint information selecting flag 295 is "ON" (S92).

With the process described above, the original checkpoint information 320 of the original storage system 30-2 of the remote system 2 is synchronized with the duplicate checkpoint information 420 of the duplicate storage system 40-2.

FIG. 15C is a flowchart showing an example of the checkpoint information mismatch resolving process #3. This process is conducted by the checkpoint information mismatch determining unit 250 of the recovery start position determining unit 220 in Step S31 of FIG. 12.

The checkpoint information mismatch resolving unit 250 of the recovery start position determining unit 220 refers to the checkpoint information management table #2 (290-2) (S101), and overwrites the checkpoint information in which the checkpoint information selecting flag 295 is "OFF" with the checkpoint information in which the checkpoint information selecting flag 295 is "ON" (S102).

With the process described above, the original checkpoint information 320 of the original storage system 30-2 of the remote system 2 is synchronized with the duplicate checkpoint information 420 of the duplicate storage system 40-2.

Figure 16:
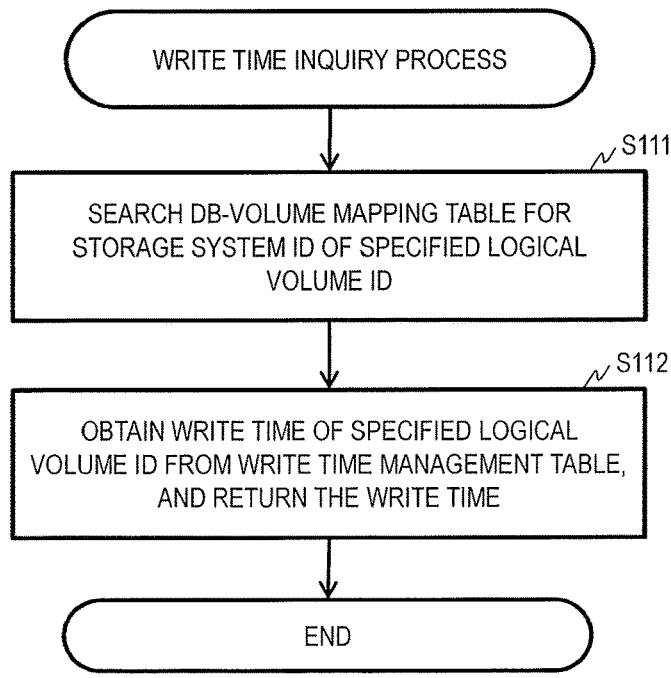
FIG. 16 is a flowchart showing an example of the WRITE time inquiry process according to the first embodiment of this invention.

FIG. 16 is a flowchart showing an example of the WRITE time inquiry process. This process is conducted in Steps S52 and S55 of FIG. 13B when the DBMS 20-2 of the remote system 2 is activated (when the DBMS is restarted).

The DBMS 20-2 of the host computer 10-2 receives the logical volume ID, and obtains the remote system storage system ID 276 from the DB-volume mapping table 270 (S111).

The host computer 10-2 obtains WRITE time 342 from the WRITE time management tables 340-3 to 340-4 of FIGS. 9C and 9D, based on the remote system storage system ID 276 obtained in Step S111 (S112).

With the process described above, the DBMS 20-2 of the remote system 2 can obtain the time at which the last checkpoint information was written (WRITE time 342) from the WRITE time management tables 340-3 and 340-4. The process to obtain the main system WRITE time is conducted separately from this process. That is, the main system WRITE time is transferred at the same time as the asynchronous transfer of the original and duplicate DB data, original and duplicate checkpoint information and original and duplicate log from the main system 1, and the original storage system 30-2 and the duplicate storage system 40-2 of the remote system 2 store the main system WRITE time in the corresponding logical volumes in the WRITE time management tables 340-3 and 340-4.

As described above, in Embodiment 1, the data in the original storage system and the duplicate storage system of the main system 1 that provides database is copied to the original storage system and duplicate storage system of the remote system 2 asynchronously with the DBMS 20-1. The data of the original and duplicate storage systems includes the checkpoint information 320 and 420 generated when the DBMS 20-1 writes the updated data of the DB buffer in the original DB data 310 of the original storage system 30-1, in addition to the DB data and log. The checkpoint information 320 and 420 is LSNs added to the messages indicating the start and end of the checkpoint. In the checkpoint information 320 and 420, the status information for the DBMS 20-1 of the main system 1 can be recorded.

In the original and duplicate storage systems of the main system 1, the mirroring process is conducted on the DB data 310 and 410, and the checkpoint information and log are duplicated by the DBMS 20-1. The mirroring function is inactive at the original and duplicate storage system of the remote system 2. The main system 1 transfers the copy of the original data to the original and duplicate storage systems of the remote system 2 asynchronously with the DBMS or the mirroring function.

Because the mirroring function is inactive in the original and duplicate storage systems of the remote system 2, when the DBMS 20-1 of the main system 1 fails, the original and duplicate DB data and the original and duplicate logs are not necessarily synchronized.

Therefore, when the DBMS 20-1 fails, the DBMS 20-2 of the remote system 2 detects a discrepancy between the original checkpoint information 320 and the duplicate checkpoint information 420. This discrepancy is detected by detecting the LSN mismatch or WRITE time mismatch.

When the original checkpoint information and duplicate checkpoint information do not match, the checkpoint information including an older LSN or WRITE time is configured as the recovery start point of the original DB data 310 and the duplicate DB data 410. The checkpoint information including an older LSN 294 in the checkpoint information management table #1 or an older main system WRITE time 298 in the checkpoint information management table #2 is selected for the recovery start position.

The recovery processing unit 260 of the DBMS 20-2 conducts the recovery process of the original DB data 310 and the duplicate DB data 410 from a newer one of the original log 330 and the duplicate log 430 at the selected recovery start position. In this way, the original DB data 310 and the duplicate DB data 410 can be recovered with the DBMS 20-2 alone.

Also, it is possible to immediately recover from failure while backing up all data in the original and duplicate storage systems of the main system 1 and the remote system 2 asynchronously with the DBMS 20-1. This makes it possible to prevent the bandwidth or the processing capacity of the network of the main system 1 from being consumed for the disaster recovery, and to make a copy of the data when there is extra room in the bandwidth or the processing capacity of the network asynchronously with the DBMS 20-1. This allows for efficient use of the processing capacity of the host computer 10-1 or the bandwidth of the network in processing big data or the like in the main system 1.

After the recovery process for the original DB data 310 and the duplicate DB data 410 is completed in the remote system 2, the original storage system 30-2 and the duplicate storage system 40-2 are made redundant, which makes it possible to ensure the redundancy of the database provided by the remote system 2.

[Embodiment 2]

Figure 17:
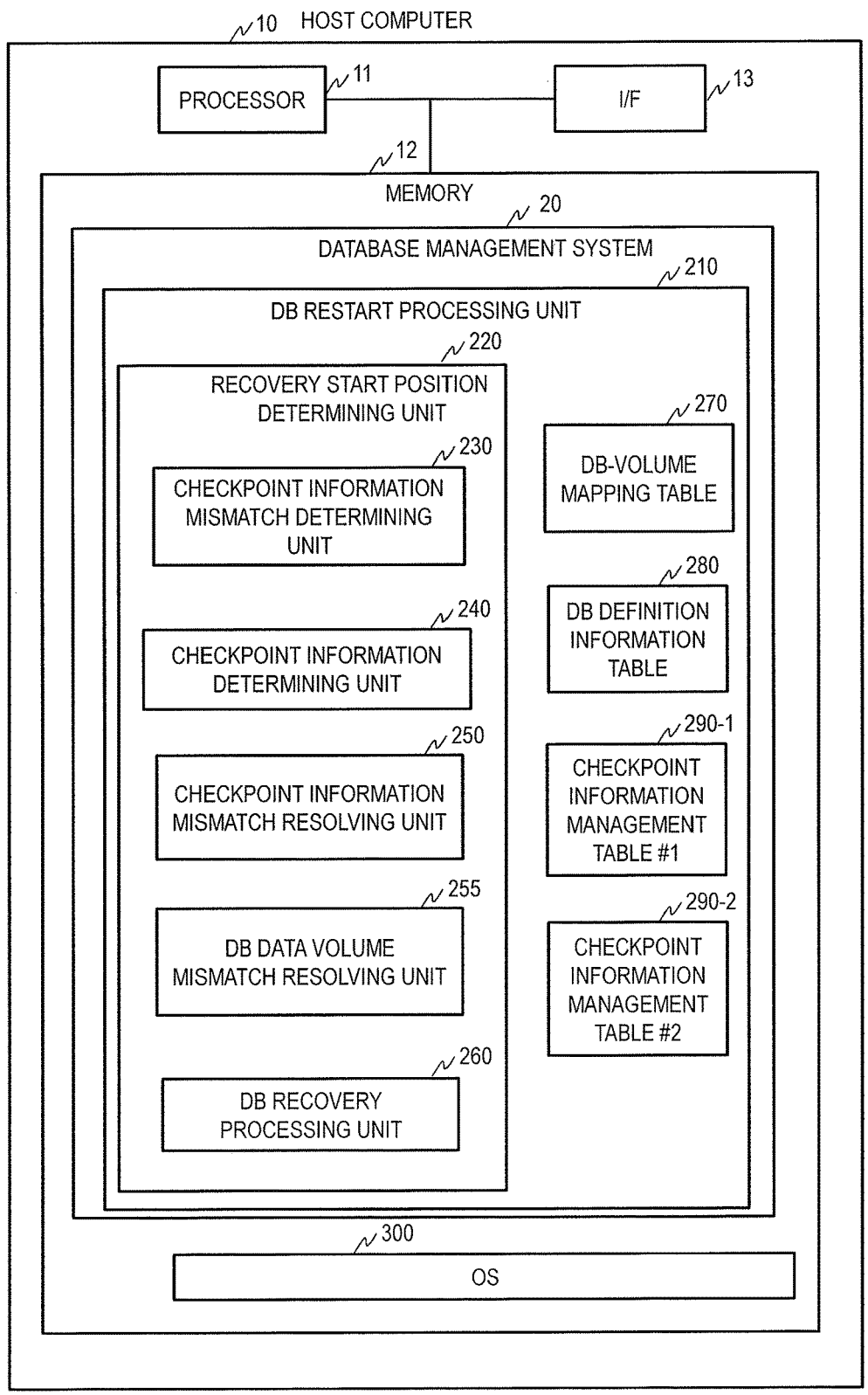
FIG. 17 is a block diagram showing an example of the host computer according to a second embodiment of this invention.

FIG. 17 is a block diagram showing an example of the host computer 10 of Embodiment 2. In Embodiment 2, the DB restart processing unit 210 of the DBMS 20-2 refers to the update time (WRITE time) of the original and duplicate DB data volumes (or original and duplicate DB data), and selects the checkpoint information based on the system of the DB data volume including a newer update time. The original and duplicate DB data volumes are synchronized with each other based on the DB data volume including a newer update time. By starting the recovery process of the original DB data 310 based on the selected checkpoint information, the recovery process of the original DB data 310 in the remote system 2 can be conducted even faster. As shown in FIG. 17, Embodiment 2 differs from Embodiment 1 above in that the host computer 10 is configured to have a DB data volume mismatch resolving unit 255. Other configurations are the same as those of Embodiment 1.

Figure 18:
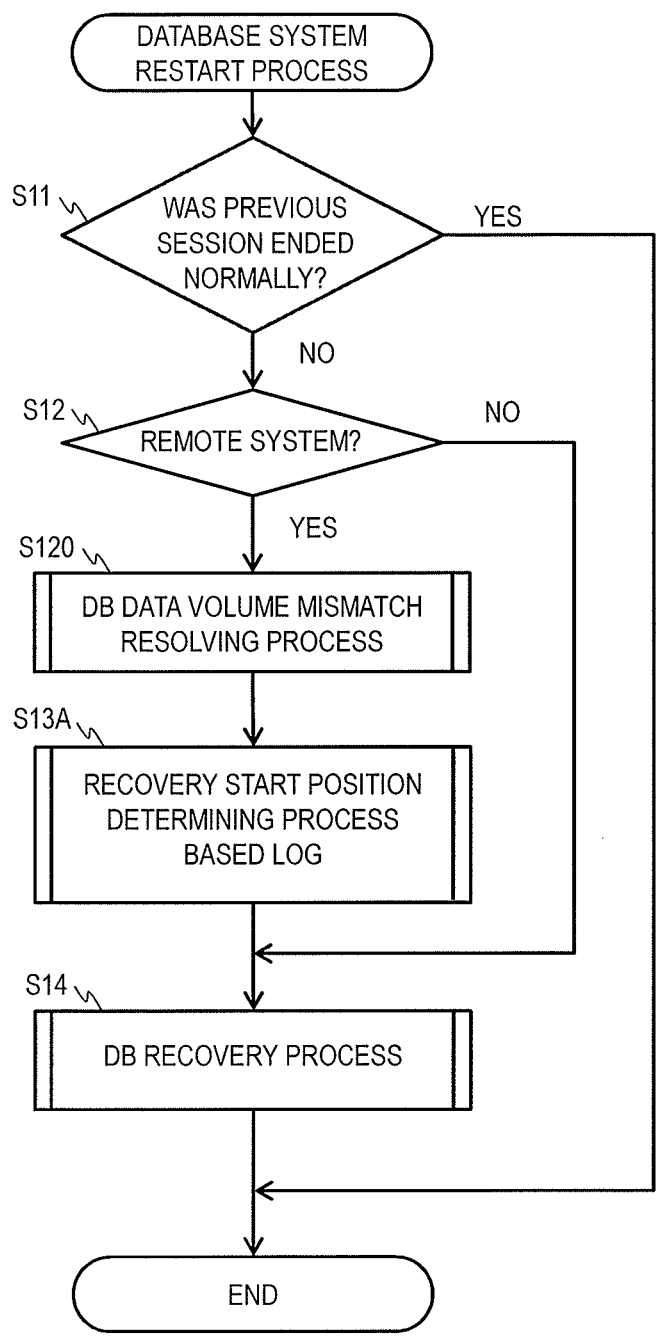
FIG. 18 is a flowchart showing an example of a process conducted by the DB restart processing unit according to the second embodiment of this invention.

FIG. 18 is a flowchart showing an example of a process conducted by the DB restart processing unit 210. FIG. 18 differs from the flowchart of FIG. 11 of Embodiment 1 in that Step S120 is added. Other steps are the same as those of Embodiment 1. Below, an example of the DB restart processing unit 210 of the DBMS 20-2 of the remote system 2 will be explained.

In Steps S11 and S12, as in Embodiment 1, if the main system 1 has failed, and if the subject system is deemed to be the remote system 2, the process moves to Step S120.

In Step S120, as described below with FIG. 19, the DB restart processing unit 210 compares the WRITE times (update times) of the original DB data volume 31 of the original storage system 30-2 and the duplicate DB data volume 41 of the duplicate storage system 40-2 of the remote system 2, and synchronizes the original and duplicate DB data volumes 31 and 41 with the DB data volume including a newer update time. The process of Step S120 will be explained in detail with reference to FIG. 19.

Next, the DB restart processing unit 210 conducts a process to determine the recovery start position from the log (S13A). This process differs from that of Embodiment 1 in that the checkpoint information with a newer WRITE time is selected instead of selecting the checkpoint information with an older LSN or WRITE time. That is, the checkpoint information of the same system (original or duplicate) as the DB data volume with a newer update time is selected for recovery.

Figure 23:
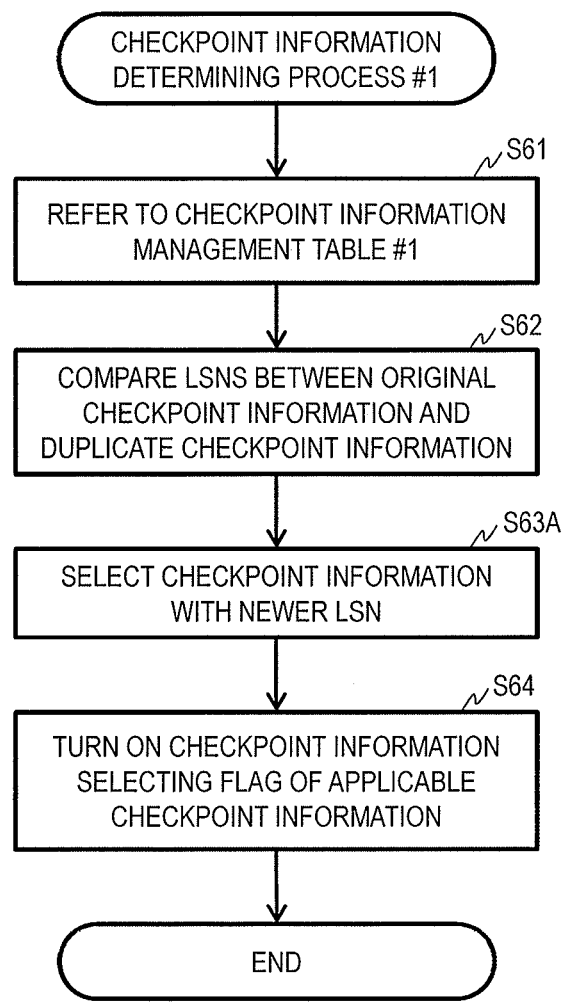
FIG. 23 is a flowchart showing an example of the checkpoint information determining process #1 according to the second embodiment of this invention.
Figure 24:
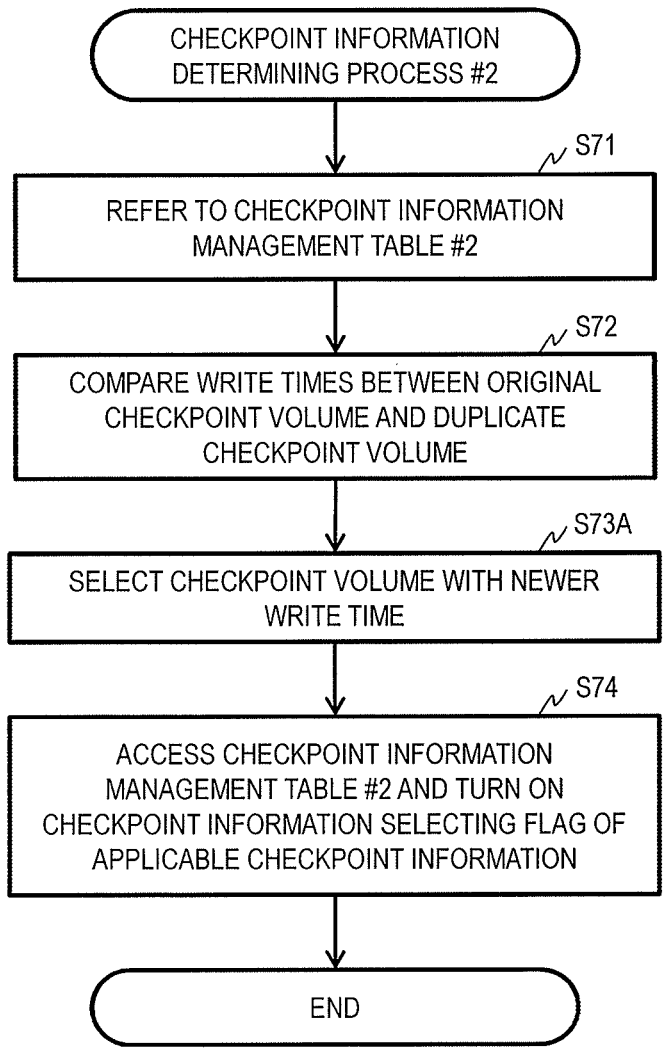
FIG. 24 is a flowchart showing an example of the checkpoint information determining process #2 according to the second embodiment of this invention.

Specifically, in the process of Step S13A, the process of FIG. 23 instead of FIG. 14A is conducted for the process of Step S24 of FIG. 12 of Embodiment 1, and the process of FIG. 24 instead of FIG. 14B is conducted for the process of Step S28 of FIG. 12. The process of FIG. 23 differs from Embodiment 1 in that the DB restart processing unit 210 selects the checkpoint information with a newer LSN in Step S63A. The process of FIG. 24 differs from Embodiment 1 in that the DB restart processing unit 210 selects the checkpoint information with a newer WRITE time in Step S73A.

The DB recovery processing part 260 conducts the recovery process by applying the original log 330 or the duplicate log 430 to the original DB data 310 of the original DB data volume 31 or the duplicate DB data 410 of the duplicate DB data volume 41, based on the LSN or WRITE time of the checkpoint information selected in Step S13A. The original log volume 33 or the duplicate log volume 43 including the same system as the checkpoint information selected in Step S13A can be used for the log to be selected.

Figure 19:
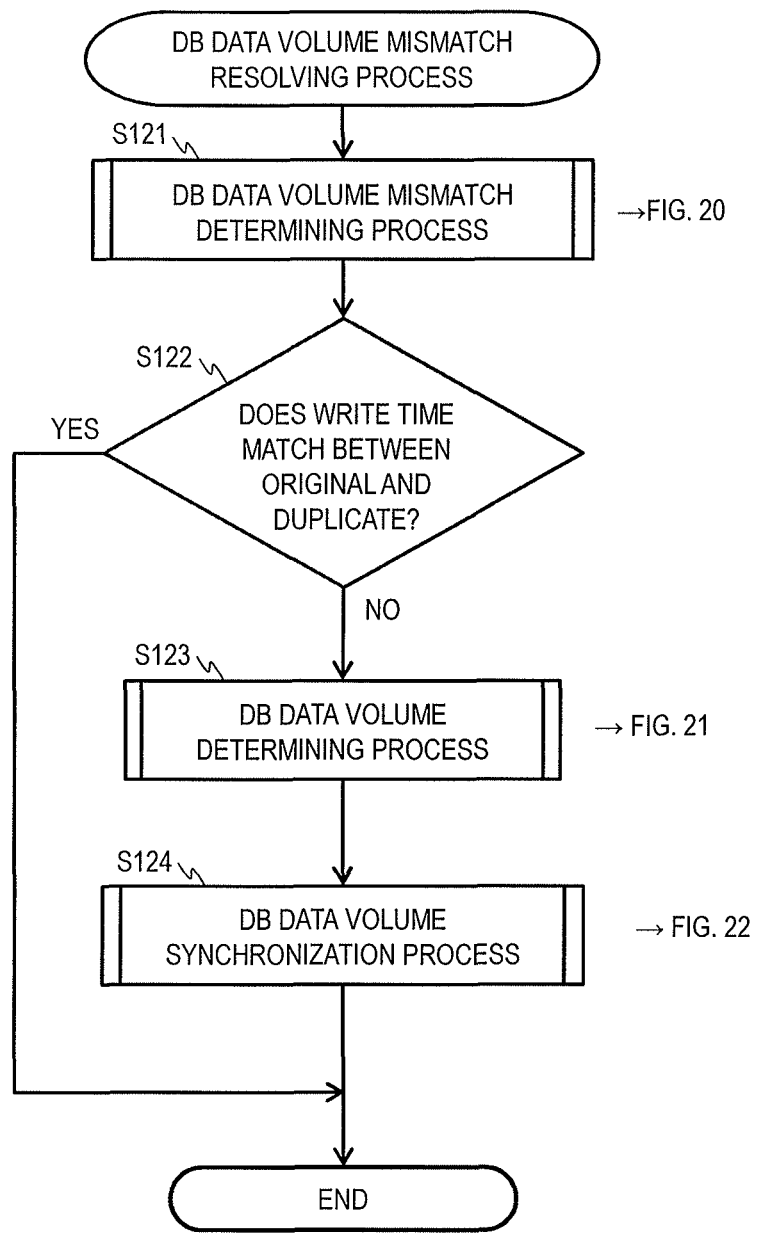
FIG. 19 is a flowchart showing an example of the process conducted by the DB data volume mismatch resolving unit according to the second embodiment of this invention.

FIG. 19 is a flowchart showing an example of the process conducted by the DB data volume mismatch resolving unit 255. This process is conducted by the DB data volume mismatch resolving unit 255 of the recovery start position determining unit 220 in Step S120 of FIG. 18.

The DB data volume mismatch resolving unit 255 determines whether the original DB data 310 of the original DB data volume 31 of the remote system 2 matches the duplicate DB data 410 of the duplicate DB data volume 41 or not (S121). In Step S122, if the original DB data 310 and the duplicate DB data 410 do not match, the process moves to Step S123, and if the two match, the process is ended and returns to the process of FIG. 18.

In Step S123, the DB data volume mismatch resolving unit 255 refers to the update times (WRITE times) of the original DB data 310 and the duplicate DB data 410, and selects the DB data volume with a newer update time as the volume for the recovery. This process will be explained in detail with reference to FIG. 21.

In Step S124, the DB data volume mismatch resolving unit 255 synchronizes the original DB data volume 31 with the duplicate data volume 41 based on the content of the DB data volume selected in Step S123. That is, the original DB data 310 and the duplicate DB data are synchronized.

With the process described above, the DB data volume mismatch resolving unit 255 refers to the update times (WRITE times) of the DB data volume, and the original and duplicate DB data volumes 31 and 41 are synchronized with the DB data volume with a newer update time.

Figure 20:
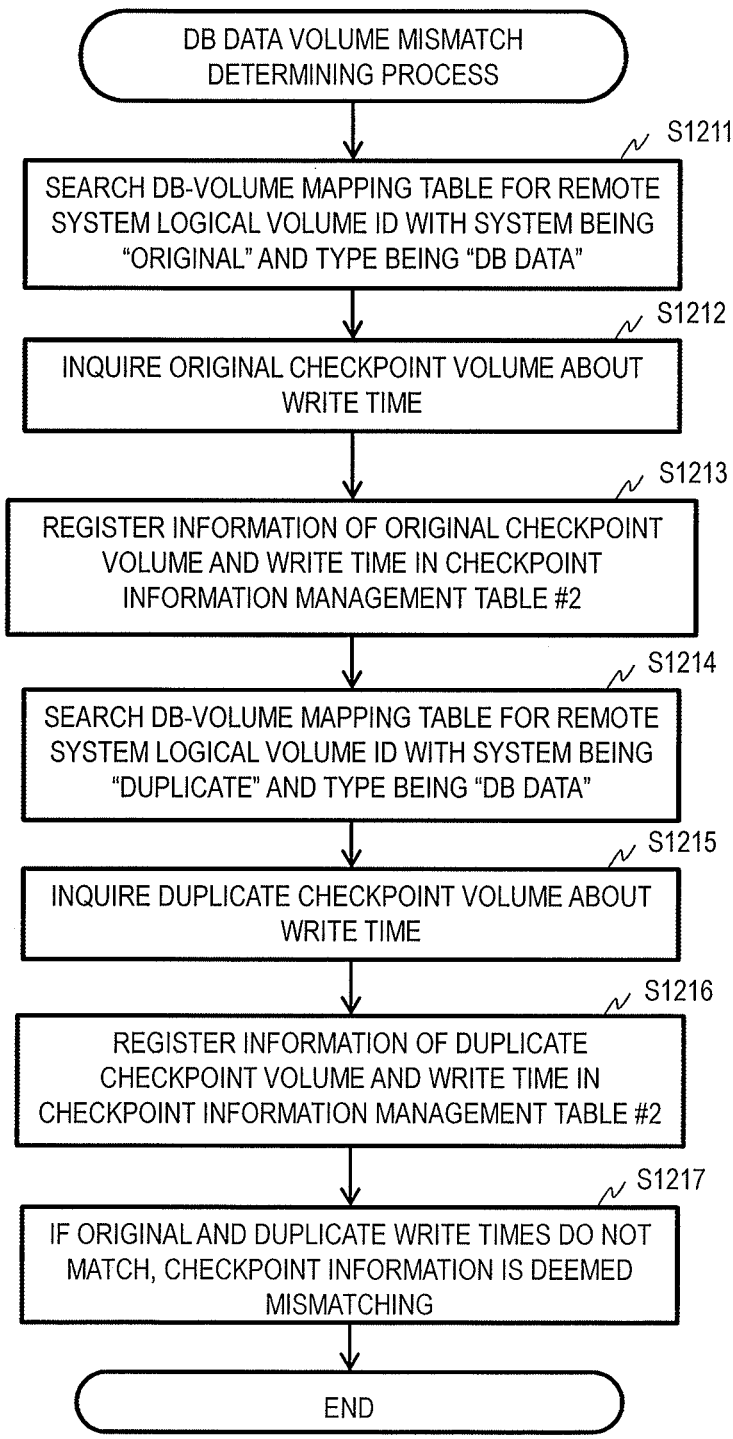
FIG. 20 is a flowchart showing an example of the DB data volume mismatch determining process according to the second embodiment of this invention.

FIG. 20 is a flowchart showing an example of the DB data volume mismatch determining process. This process is conducted by the DB data volume mismatch resolving unit 255 in Step S121 of FIG. 19.

The recovery start position determining unit 220 refers to the DB-volume mapping table 270 and searches for a remote system logical volume ID with the system 272 being "original" and the type 273 being "DB data (S1211).

VOL1-B1 under the remote system logical volume ID 277 of FIG. 5 is the target volume ID. This logical volume ID=VOL1-B1 corresponds to the original DB data volume 31 of the original storage system 30-2 of FIG. 1, and stores therein the original DB data 310.

The recovery start position determining unit 220 inquires the original storage system 30-2 that stores the original checkpoint information 320 about the time (WRITE time) at which the original DB data 310 was last written in the main system 1 (S1212).

That is, the recovery start position determining unit 220 inquires the original storage system 30-2 that controls the logical volume ID=VOL1-B1 found in Step S1211 about the value of the WRITE time management table 340-3 shown in FIG. 9C.

When receiving the WRITE time from the host computer 30-2, the recovery start position determining unit 220 stores the received WRITE time in the main system WRITE time 298 with the system 292 being "original" in the checkpoint information management table #2 (S1213).

The recovery start position determining unit 220 refers to the DB-volume mapping table 270 and searches for a remote system logical volume ID with the system 272 being "duplicate" and the type 273 being "DB data" (S1214). VOL1-B2 under the remote system logical volume ID 277 of FIG. 5 is the target volume ID. This logical volume ID=VOL1-B2 corresponds to the duplicate checkpoint information volume 42 of the duplicate storage system 40-2 of FIG. 1, and stores therein the duplicate checkpoint information 420.

The recovery start position determining unit 220 inquires the duplicate storage system 40-2 about the time (WRITE time) at which the duplicate checkpoint information was last written in the main system 1 (S1215).

That is, the recovery start position determining unit 220 inquires the duplicate storage system 40-2 about the WRITE time for the logical volume ID=VOL1-B2 searched for in Step S1215.

When receiving the WRITE time from the duplicate storage system 40-2, the recovery start position determining unit 220 stores the received WRITE time in the main system WRITE time 298 with the system 292 being "duplicate" in the checkpoint information management table #2 (S1216).

If the main system WRITE time 298 with the system 292 being "original" and the main system WRITE time 298 with the system 292 being "duplicate" do not coincide with each other, the recovery start position determining unit 220 determines that the original DB data 310 and the duplicate DB data 410 do not match (S1217).

With the process described above where the WRITE times of the last original DB data 310 and duplicate DB data 410 are compared, a discrepancy between the original and duplicate DB data backed up asynchronously can be detected.

Figure 21:
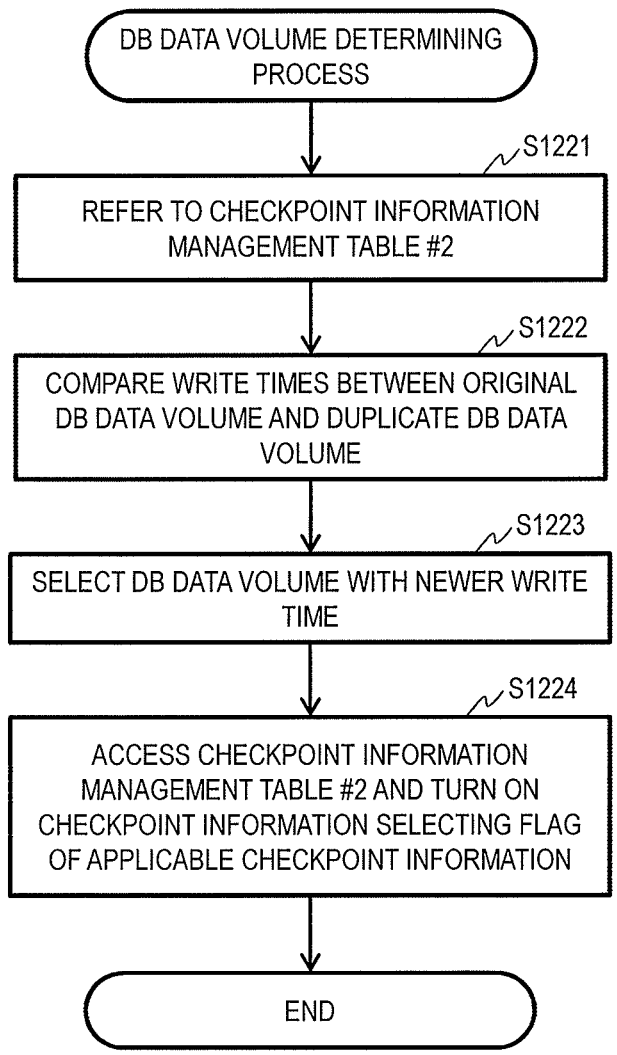
FIG. 21 is a flowchart showing an example of the DB data volume determining process according to the second embodiment of this invention.

FIG. 21 is a flowchart showing an example of the DB data volume determining process. This process is conducted by the recovery start position determining unit 220 in Step S123 of FIG. 19.

The recovery start position determining unit 220 refers to the checkpoint information management table #2 (290-2) (S1221), and compares the value of the main system WRITE time with the system 292 being "original" with the value of the main system WRITE time with the system 292 being "duplicate" (S1222).

Then the recovery start position determining unit 220 selects the checkpoint information of the main system WRITE time 298 of the checkpoint information management table #2 for the volume used to recover the original DB data 310 (S1223). The recovery start position determining unit 220 turns on the checkpoint information selecting flag 295 for the selected checkpoint information in the checkpoint information management table #1. The default value of the checkpoint information selecting flag 295 is "OFF."

With the process described above, the DB data volume with a newer LSN or main system WRITE time 298 is selected, and the checkpoint information selecting flag 295 is updated to "ON."

Figure 22:
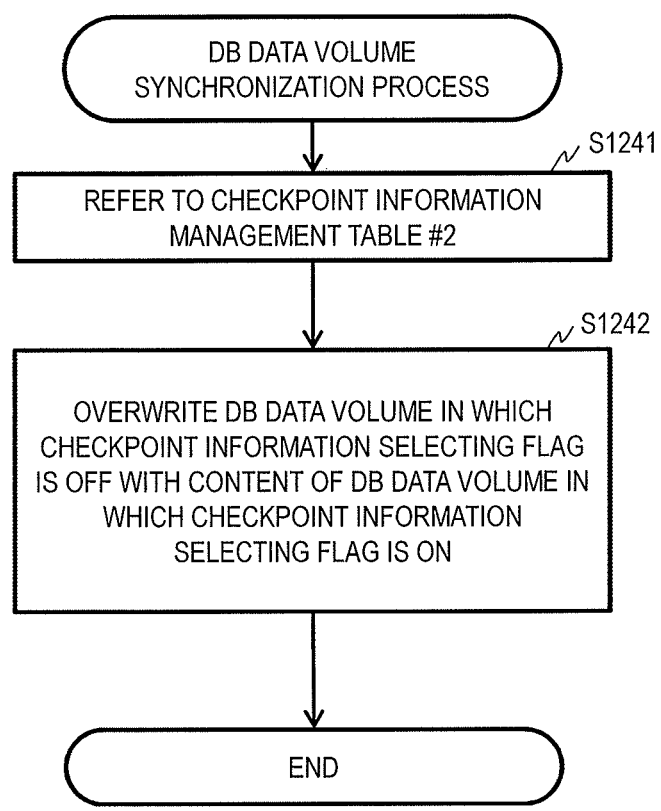
FIG. 22 is a flowchart showing an example of the DB data volume synchronization process according to the second embodiment of this invention.

FIG. 22 is a flowchart showing an example of the DB data volume synchronization process. This process is conducted by the recovery start position determining unit 220 in Step S124 of FIG. 19.

The recovery start position determining unit 220 refers to the checkpoint information management table #2 (290-2) (S1241), and overwrites the DB data volume in which the checkpoint information selecting flag 295 is "OFF" with the DB data volume in which the checkpoint information selecting flag 295 is "ON" (S1242).

With this process, the original DB data 310 of the original storage system 30-2 of the remote system 2 and the duplicate DB data 410 of the duplicate storage system 40-2 are synchronized based on the content of the DB data including a newer WRITE time.

With the process described above, in Embodiment 2, the DB restart processing unit 210 obtains the update times (WRITE times) of the DB data volumes 31 and 41 of the remote system 2 from the storage system of the main system 1, and selects the checkpoint information based on the system of the DB data volume with a newer update time. The DB restart processing unit 210 synchronizes the original and duplicate DB data volumes 31 and 41 with the DB data volume including a newer update time. By starting the recovery process of the original DB data 310 from the original log 330 or the duplicate log 430 based on the selected checkpoint information, the recovery process of the original DB data 310 in the remote system 2 can be conducted even faster.

[Embodiment 3]

Figure 25:
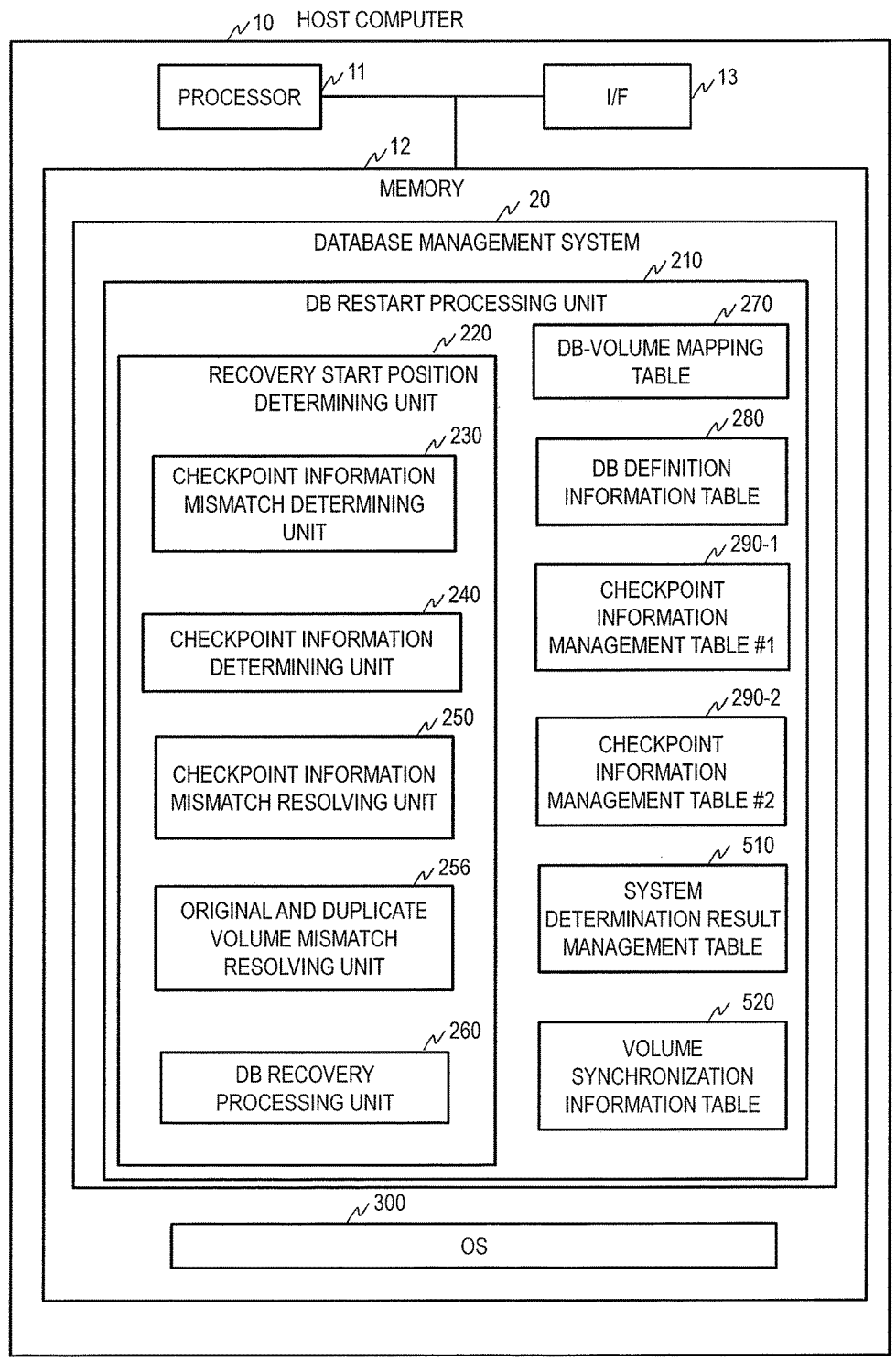
FIG. 25 is a block diagram showing an example of the host computer according to a third embodiment of this invention.

FIG. 25 is a block diagram showing an example of the host computer 10 of Embodiment 3. In Embodiment 3, the DB restart processing unit 210 of the DBMS 20-2 uses, for an updating system, the system of one of original and duplicate checkpoint information volumes (or original or duplicate checkpoint information) including a more recent update time (WRITE time). If the update times of the original and duplicate DB checkpoint volumes (or original and duplicate checkpoint information) coincide with each other, the system of the original or duplicate log volume in which the original log volume 33 or duplicate log volume 43 includes an newer update time (WRITE time) is used for the updating system. Then after overwriting the other system with the updating system, which is the synchronization source, the recovery of the original DB data 310 is conducted. This reduces the time required for the DB data recovery process.

As shown in FIG. 25, the configuration of the host computer 10 differs from that of Embodiment 1 in that an original-duplicate volume mismatch resolving unit 256, a system determination result management table 510, and a volume synchronization information table 520 are added. Other configurations are the same as those of Embodiment 1.

FIG. 29 is a diagram showing an example of a system determination result management table 510. The system determination result management table 510 includes the synchronization source storage system ID 511 and the synchronization target storage system ID 512 in one record. The example of the figure indicates the original storage system 30-2 (ID="CTL#B1") is overwritten with the content of the duplicate storage system 40-2 (ID="CTL#B2") of the remote system 2.

FIG. 30 is a diagram showing an example of the volume synchronization information table 520. The volume synchronization information table 520 managed by the DB restart processing unit 210 includes, in one record, the type 521 for storing the type of data, the synchronization source storage system ID 522 that is an identifier for the copy source, the synchronization source volume ID 523 that is an identifier for copy source volume, the synchronization target storage system ID 524 that is an identifier for the system to be overwritten, and the synchronization target volume ID 525 that is an identifier for the volume to be overwritten.

Figure 26:
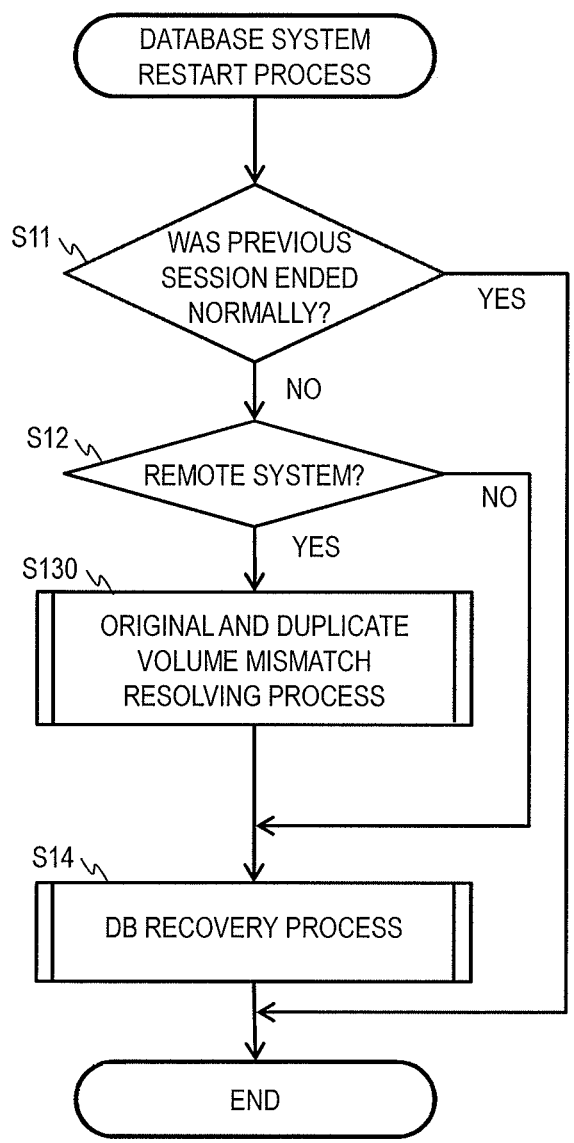
FIG. 26 is a flowchart showing an example of a process conducted by the DB restart processing unit according to the third embodiment of this invention.

FIG. 26 is a flowchart showing an example of a process conducted by the DB restart processing unit 210. FIG. 26 differs from the flowchart of FIG. 11 of Embodiment 1 in that the recovery start position determining process based on the log of Step S13 is replaced with the original-duplicate volume mismatch resolving process of Step S130. Other steps are the same as those of Embodiment 1. Below, an example of the DB restart processing unit 210 of the DBMS 20-2 of the remote system 2 will be explained.

In Steps S11 and S12, as in Embodiment 1, if the main system 1 has failed and if the subject system is deemed to be the remote system 2, and the process moves to Step S130.

In Step S130, the original-duplicate volume mismatch resolving unit 256 of the DB restart processing unit 210 selects one of the systems in which the checkpoint information volume (or checkpoint information) includes a newer update time (WRITE time), or the log volume includes a newer update time (WRITE time) as the system of the synchronization source (storage system), and selects the other system as the synchronization target. Then the original-duplicate volume mismatch resolving unit 256 overwrites the content of the system of the synchronization target with the content of the system of the synchronization source. This way, the original-duplicate volume mismatch resolving unit 256 synchronizes the original and duplicate volumes with each other based on the content of system with a newer DB data update time or newer log update time.

In Step S14, the DB recovery processing unit 260 conducts the recovery process by applying the original log 330 to the original DB data 310 of the original DB data volume 31, based on the LSN or WRITE time of the checkpoint information synchronized in Step S130.

With the process described above, the original and duplicate volumes are synchronized with each other based on the system with a newer update time of the checkpoint information or a newer log update time, and then the original DB data 310 is recovered by applying the log from the nearest LSN or WRITE time. This makes it possible to narrow down the range of the log application and to speed up the recovery process.

Figure 27:
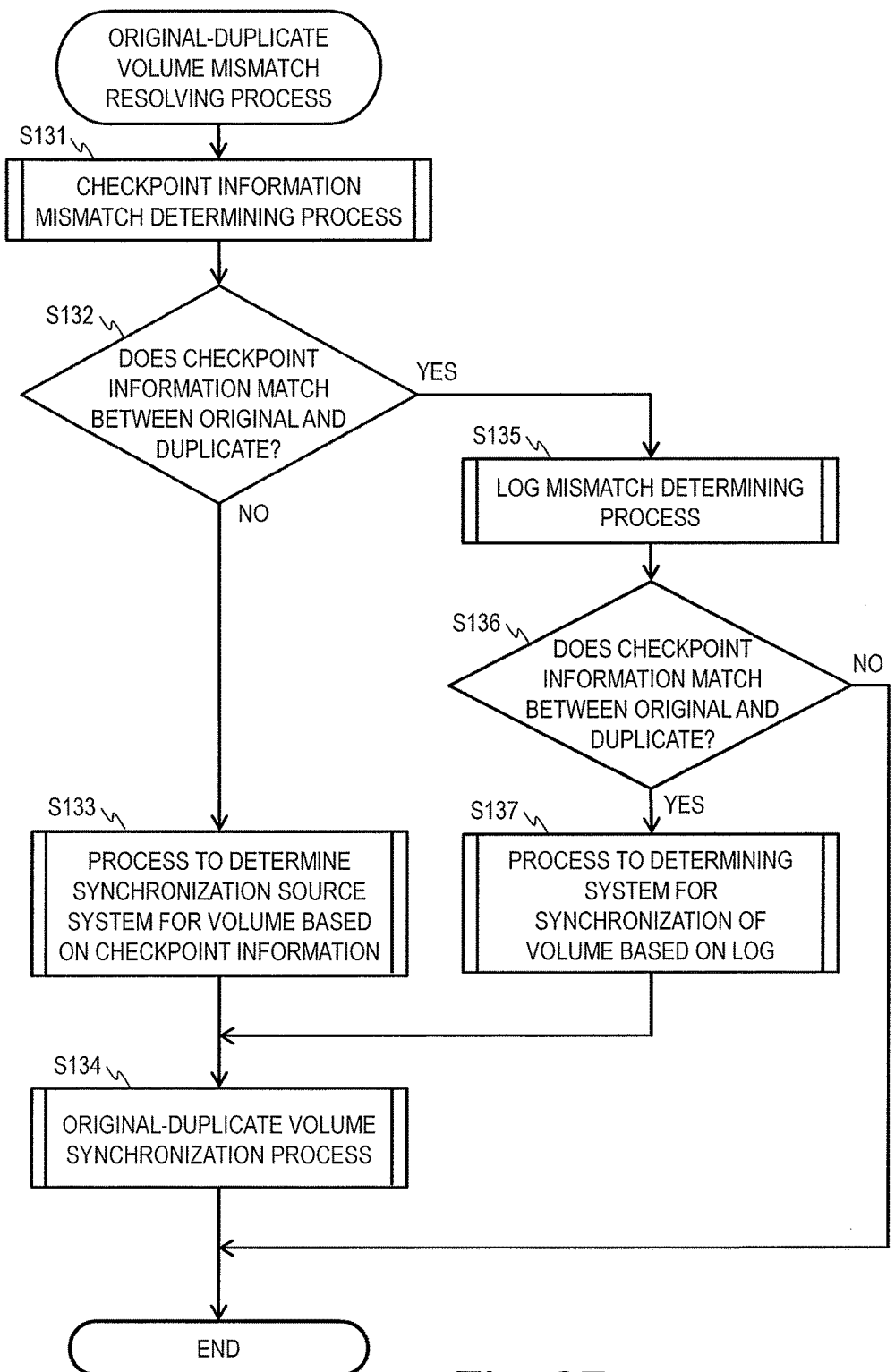
FIG. 27 is a flowchart showing an example of the original-duplicate volume mismatch resolving unit according to the third embodiment of this invention.

FIG. 27 is a flowchart showing an example of the original-duplicate volume mismatch resolving unit 256. This process is conducted by the original-duplicate volume mismatch resolving unit 256 in Step S130 of FIG. 26.

The original-duplicate mismatch resolving unit 256 determines whether the LSNs or update times (WRITE Time) coincide with each other between the original checkpoint information 320 and the duplicate checkpoint information 420 (S131). This process is realized by conducting either the checkpoint information mismatch determining process #1 based on LSN shown in FIG. 13A of Embodiment 1 or the checkpoint information mismatch determining process #2 based on the WRITE time shown in FIG. 13B.

In Step S132, the original-duplicate volume mismatch resolving unit 256 determines whether the original checkpoint information 320 coincides with the duplicate checkpoint information 420 based on the result of Step S131. If the two coincide, the process moves to Step S135, and if not, the process moves to Step S133.

In Step S133, the original-duplicate volume mismatch resolving unit 256 selects the system of the volume including newer checkpoint information as the synchronization source, and selects the other system as the synchronization target. A volume with newer checkpoint information can be determined by conducting the flowchart of FIG. 23 or FIG. 24 of Embodiment 2.

In Step S137, the original-duplicate volume mismatch resolving unit 256 selects the system of the volume including a newer log as the synchronization source, and selects the other system as the synchronization target. A volume in which the original log 330 or the duplicate log 430 includes a newer update time (main system WRITE time) can be selected for the synchronization source in a manner similar to the checkpoint information of FIG. 24 of Embodiment 2.

In Step S134, the original-duplicate volume mismatch resolving unit 256 overwrites the content of the system of the synchronization target with the content of the system of the synchronization source, which was determined in Step S133 or S137 above, thereby synchronizing the original and duplicate volumes.

Figure 28:
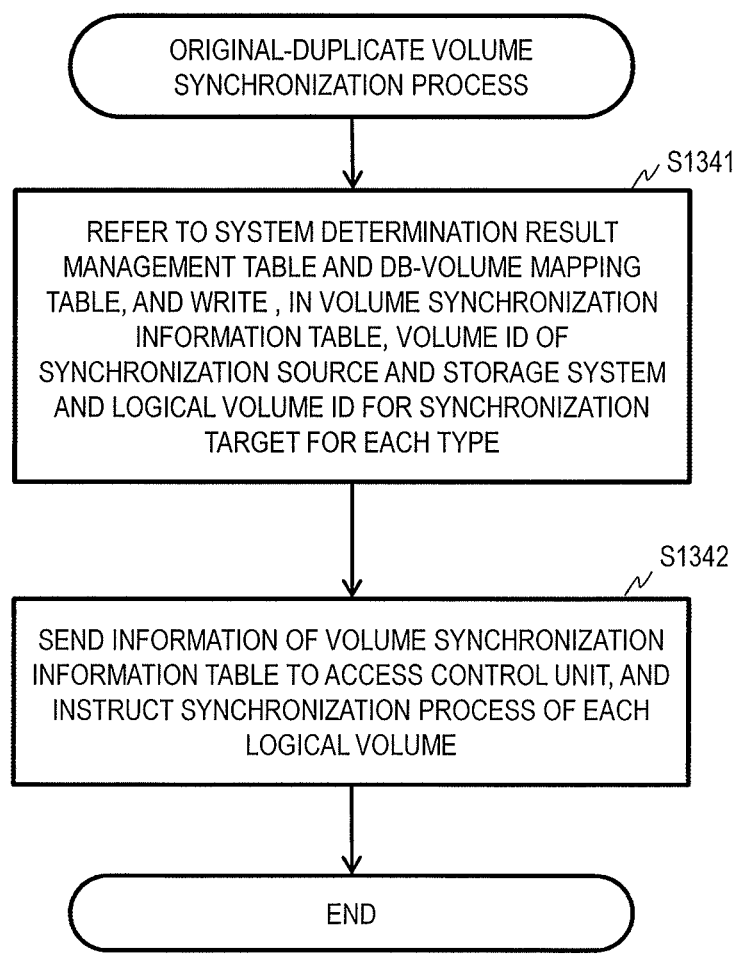
FIG. 28 is a flowchart showing an example of the original-duplicate volume synchronization process according to the third embodiment of this invention.

FIG. 28 is a flowchart showing an example of the original-duplicate volume synchronization process. The original-duplicate volume mismatch resolving unit 256 refers to the DB-volume mapping table 270, stores the obtained storage system ID of the system of the synchronization source in the synchronization source storage system ID 511 of the system determination result management table 510, and stores the storage system ID of the other system in the synchronization target storage system ID 512. The original-duplicate volume mismatch resolving unit 256 configures the logical volume ID in the volume synchronization information table 520 for each data type of the storage system of the synchronization source and target (S1341).

The original-duplicate volume mismatch resolving unit 256 sends the information of the volume synchronization information table 520 to the access control units 34 and 44 of the original and duplicate storage systems 30-2, 40-2, respectively, and overwrites the content of the logical volume of the synchronization target with the content of the logical volume of the synchronization source, thereby conducting the synchronization.

As described above, in Embodiment 3, the system with a newer checkpoint information or log is selected for the updating system, and the recovery from the log is conducted after synchronizing the other system with the updating system. This makes it possible to narrow down the log application range, and to speed up the DB data recovery process.

<Conclusion>

A part of all of the configurations, processing units, processing means, and the like such as computers described in the present invention may be realized by special hardware.

The various types of software described in the embodiments above can be stored in various types of recording medium such as electromagnetic, electronic, optical, and the like (non-transitory recording medium, for example), and can be downloaded to a computer through a network such as the Internet.

The present invention is not limited to the embodiments described above, and may include various modification examples. For example, the embodiments above were explained in detail to clarify the present invention, but the present invention is not limited to including all of the configurations described above.

The respective embodiments above described an example in which the restart processing unit 210 of the DBMS 20-2 of the remote system 2 detects a discrepancy in data between the original and duplicate storage systems of the remote system 2 at a prescribed interval, but a discrepancy in data between the original and duplicate storage systems of the remote system 2 may also be detected when the remote system 2 receives a notification indicating an occurrence of failure of the DBMS 20-1 of the main system 1, and the like. The restart processing unit 210 of the DBMS 20-2 may start the recovery process when the host computer 10-2 of the remote system loses communication with the main system 1, when the host computer 10-2 cannot detect the heartbeat of the host computer 10-2 of the main system 2, or the like.

What is claimed is:

1. A database system control method including a first site configured to provide database and a second site configured to store a copy of the database, the database system being configured to recover the database by a control computer of the second site, the first site comprising:
   a first computer that includes a processor and a memory and that operates a database management unit configured to control the database;
   a first original storage apparatus for storing data related to the database, wherein the data related to the database includes data of the database, a log generated when the database is updated, and checkpoint information generated at a prescribed timing; and
   a first duplicate storage apparatus for storing a copy of the data stored in the first original storage apparatus,
   the second site comprising:
   a second computer that includes a processor and a memory and that operates a restart processing unit configured to recover the database;
   a second original storage apparatus for storing the data received from the first original storage apparatus; and
   a second duplicate storage apparatus for storing the data received from the first duplicate storage apparatus,
   the control method comprising:
   a first step in which the first computer processes the database and updates the data in the database, and when the data of the database is updated, the first computer generates a log of the updated data and stores the log in the first original storage apparatus; and a step in which, when the data of the updated database is written in the first original storage apparatus, the first computer generates checkpoint information indicating the position of the log, and stores the updated data and the checkpoint information in the first original storage apparatus;
   a second step in which the first original storage apparatus sends the data to the second original storage apparatus asynchronously with the database management unit;
   a third step in which the first duplicate storage apparatus sends the data to the second duplicate storage apparatus asynchronously with the database management unit;
   a fourth step in which the second computer compares the data of the second original storage apparatus and the data of the second duplicate storage apparatus at a prescribed timing, and the second computer compares the checkpoint information in the second original storage apparatus with the checkpoint information in the second duplicate storage apparatus; and
   a fifth step in which, if the data of the second original storage apparatus and the data of the second duplicate storage apparatus have discrepancy as a result of the comparison, the second computer recovers the database, and when the checkpoint information does not coincide with each other between the second original storage apparatus and the second duplicate storage apparatus as a result of the comparison, the second computer determines a recovery start position of the log by selecting one of the two types of checkpoint information, and recovers data by applying the log to the database from the recovery start position.

2. The database system control method according to claim 1, wherein the fifth step includes a step in which the second computer selects an older one of the checkpoint information of the second original storage apparatus and the checkpoint information of the second duplicate storage apparatus, determines a recovery start position based on a log corresponding to the selected checkpoint information, and recovers data by applying the log to the database from the recovery start position.

3. The database system control method according to claim 1, wherein the data related to the database includes data of the database, a log generated when the database is updated, and checkpoint information generated at a prescribed timing,
   wherein the first step includes: a step in which, when the data of the database is updated, the first computer generates a log of the updated data and stores the log in the first original storage apparatus; a step in which, when the data of the updated database is written in the first original storage apparatus, the first computer generates checkpoint information indicating the position of the log, and stores the updated data and the checkpoint information in the first original storage apparatus; a step in which the first original storage apparatus stores a first write time at which the checkpoint information was stored in the first original storage apparatus; and a step in which the first duplicate storage apparatus stores a second write time at which the checkpoint information was stored in the first duplicate storage apparatus,
   wherein the fourth step includes a step in which the second computer obtains the first write time stored in the first original storage apparatus by the first computer for the checkpoint information of the second original storage apparatus, obtains the second write time stored in the first duplicate storage apparatus by the first computer for the checkpoint information of the second duplicate storage apparatus, and compares the first write time with the second write time, and
   wherein the fifth step includes a step in which, when the first write time does not coincide with the second write time as a result of the comparison, the second computer determines a recovery start position of the log by selecting one of the two types of checkpoint information, and recovers data by applying the log to the database from the recovery start position.

4. The database system control method according to claim 3, wherein the fifth step includes a step in which, when the first write time does not coincide with the second write time, the second computer selects an older one of the first write time and the second write time, determines a recovery start position of the log based on the checkpoint information corresponding to the selected write time, and recovers data by applying the log to the database from the recovery start position.

5. The database system control method according to claim 1, wherein the fifth step further includes a step in which, when the checkpoint information does not coincide with each other between the second original storage apparatus and the second duplicate storage apparatus as a result of the comparison, the second computer selects one of the two types of checkpoint information, and overwrites the not-selected checkpoint information with the content of the selected checkpoint information, or initializes the not-selected checkpoint information.

6. The database system control method according to claim 1, wherein the data related to the database includes data of the database, a log generated when the database is updated, and checkpoint information generated at a prescribed timing,
   wherein the first step includes: a step in which, when the data of the database is updated, the first computer generates a log of the updated data and stores the log in the first original storage apparatus; and a step in which, when the data of the updated database is written in the first original storage apparatus, the first computer generates checkpoint information indicating the position of the log, and stores the updated data and the checkpoint information in the first original storage apparatus, wherein the fourth step includes a step in which the second computer compares data of the database in the second original storage apparatus with data of the database in the second duplicate storage apparatus, and wherein the fifth step includes: a step in which, if the data of the database in the second original storage apparatus and the data of the database in the second duplicate storage apparatus have a discrepancy as a result of the comparison, the second computer selects one of the two types of data of the database; a step in which the second computer overwrites the not-selected data of the database with the selected data of the database; and a step in which the second computer selects one of the second original storage apparatus and the second duplicate storage apparatus as the storage apparatus that stores the selected data of the database, determines a recovery start position of the log based on the checkpoint information of the selected storage apparatus, and recovers data by applying the log to the database from the recovery start position.

7. The database system control method according to claim 1, wherein the data related to the database includes data of the database, a log generated when the database is updated, and checkpoint information generated at a prescribed timing, wherein the first step includes: a step in which, when the data of the database is updated, the first computer generates a log of the updated data and stores the log in the first original storage apparatus, a step in which, when the data of the updated database is written in the first original storage apparatus, the first computer generates checkpoint information indicating the position of the log, and stores the updated data and the checkpoint information in the first original storage apparatus; a step in which the first original storage apparatus stores a first write time at which the checkpoint information was stored in the first original storage apparatus; a step in which the first duplicate storage apparatus stores a second write time at which the checkpoint information was stored in the first duplicate storage apparatus; a step in which the first original storage apparatus stores a third write time at which the log was stored in the first original storage apparatus; and a step in which the first duplicate storage apparatus stores a fourth write time at which the log was stored in the first duplicate storage apparatus, wherein the fourth step includes a step in which the second computer obtains the first write time stored in the first original storage apparatus by the first computer for the checkpoint information of the second original storage apparatus, obtains the second write time stored in the first duplicate storage apparatus by the first computer for the checkpoint information of the second duplicate storage apparatus, compares the first write time with the second write time, and, if the first write time and the second write time are the same, compares the third write time with the fourth write time, and wherein the fifth step includes a step in which, if the third write time does not coincide with the fourth write time as a result of the comparison, the second computer selects one of the two logs, selects one of the second original storage apparatus and the second duplicate storage apparatus as the storage apparatus that stores the selected log, overwrites the not-selected storage apparatus with the content of the selected storage apparatus, determines the recovery start position based on the selected log, and recovers data by applying the log to the database from the recovery start position.

8. A database system comprising a first site configured to provide database and a second site configured to store a copy of the database, the database system being configured to recover the database by a control computer of the second site, wherein the first site comprises:
a first computer that includes a processor and a memory and that operates a database management unit configured to control the database;
a first original storage apparatus for storing data related to the database, wherein the data related to the database includes data of the database, a log generated when the database is updated, and checkpoint information generated at a prescribed timing; and
a first duplicate storage apparatus for storing a copy of the data stored in the first original storage apparatus, wherein the second site comprises:
a second computer that includes a processor and a memory and that operates a restart processing unit configured to recover the database;
a second original storage apparatus for storing the data received from the first original storage apparatus; and
a second duplicate storage apparatus for storing the data received from the first duplicate storage apparatus, wherein the first computer processes the database and updates the data in the database, wherein the first original storage apparatus sends the data to the second original storage apparatus asynchronously with the database management unit, wherein the first duplicate storage apparatus sends the data to the second duplicate storage apparatus asynchronously with the database management unit, wherein the restart processing unit of the second computer compares data in the second original storage apparatus with data in the second duplicate storage apparatus at a prescribed timing, and if the data in the data in the second original storage apparatus does not coincide with the data in the second duplicate storage apparatus, the restart processing unit recovers the database, wherein the database management unit of the first computer generates a log of updated data and stores the log in the first original storage apparatus when data in the database is updated, generates checkpoint information indicating the position of the log and stores the updated data and the checkpoint information in the first original storage apparatus when updated data of the database is written in the first original storage apparatus, and wherein, when the checkpoint information in the second original storage apparatus and the checkpoint information in the second duplicate storage apparatus do not coincide with each other as a result of comparing the checkpoint information in the second original storage apparatus and the checkpoint information in the second duplicate storage apparatus, the restart processing unit of the second computer determines a recovery start position of the log by selecting one of the two types of checkpoint information, and recovers data by applying the log to the database from the recovery start position.

9. The database system according to claim 8, wherein the restart processing unit of the second computer selects an older one of the checkpoint information in the second original storage apparatus and the checkpoint information in the second duplicate storage apparatus, determines a recovery start position based on a log corresponding to the selected checkpoint information, and recovers data by applying the log to the database from the recovery start position.

10. The database system according to claim 8, wherein the data related to the database includes data of the database, a log generated when the database is updated, and checkpoint information generated at a prescribed timing,
   wherein the database management unit of the first computer generates a log of updated data and stores the log in the first original storage apparatus when data in the database is updated, generates checkpoint information indicating the position of the log and stores the updated data and the checkpoint information in the first original storage apparatus when updated data of the database is written in the first original storage apparatus,
   wherein the first original storage apparatus stores a first write time at which the checkpoint information was stored in the first original storage apparatus,
   wherein the first duplicate storage apparatus stores a second write time at which the checkpoint information was stored in the first duplicate storage apparatus, and
   wherein the restart processing unit of the second computer obtains the first write time stored in the first original storage apparatus by the first computer for the checkpoint information of the second original storage apparatus, obtains the second write time stored in the first duplicate storage apparatus by the first computer for the checkpoint information of the second duplicate storage apparatus, compares the first write time with the second write time, and if the first write time and the second write time do not coincide with each other, the restart processing unit determines a recovery start position of the log by selecting one of the two types of checkpoint information, and recovers data by applying the log to the database from the recovery start position.

11. The database system according to claim 10, wherein, when the first write time does not coincide with the second write time, the restart processing unit of the second computer selects an older one of the first write time and the second write time, determines a recovery start position of the log based on the checkpoint information corresponding to the selected write time, and recovers data by applying the log to the database from the recovery start position.

12. The database system according to claim 8, wherein, when the checkpoint information does not coincide with each other between the second original storage apparatus and the second duplicate storage apparatus as a result of the comparison, the restart processing unit of the second computer selects one of the two types of checkpoint information, and overwrites the not-selected checkpoint information with the content of the selected checkpoint information, or initializes the not-selected checkpoint information.

13. The database system according to claim 8, wherein the data related to the database includes data of the database, a log generated when the database is updated, and checkpoint information generated at a prescribed timing,
   wherein the database management unit of the first computer generates a log of updated data and stores the log in the first original storage apparatus when data in the database is updated, generates checkpoint information indicating the position of the log and stores the updated data and the checkpoint information in the first original storage apparatus when updated data of the database is written in the first original storage apparatus,
   wherein, when the database data of the second original storage apparatus and the database data of the second duplicate storage apparatus do not coincide with each other as a result of comparing the database data of the second original storage apparatus and the database data of the second duplicate storage apparatus, the restart processing unit of the second computer selects one of the two types of data of the database, and overwrites the not-selected data of the database with the selected data of the database, and
   wherein the second computer selects one of the second original storage apparatus and the second duplicate storage apparatus as the storage apparatus that stores the selected data of the database, determines a recovery start position of the log based on the checkpoint information of the selected storage apparatus, and recovers data by applying the log to the database from the recovery start position.

* * * * *